United States Patent
Matsumoto et al.

(10) Patent No.: US 6,301,611 B1
(45) Date of Patent: Oct. 9, 2001

(54) COMMUNICATION APPARATUS CONNECTABLE TO INFORMATION PROCESSING TERMINAL SUCH AS PERSONAL COMPUTER

(75) Inventors: Naoyuki Matsumoto, Yokohama; Itaru Ikegami, Kawasaki; Masaya Kondo, Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/798,369

(22) Filed: Feb. 10, 1997

(30) Foreign Application Priority Data

Feb. 9, 1996 (JP) .................................................... 8-046949
Feb. 6, 1997 (JP) .................................................... 9-036939

(51) Int. Cl.$^7$ ........................................................ G06F 13/00
(52) U.S. Cl. ............................................................. 709/217
(58) Field of Search ............................ 395/840, 112, 395/114, 188; 358/442, 468, 404; 379/100.06; 710/20; 709/200, 201, 203, 212, 216, 217, 218, 219

(56) References Cited

U.S. PATENT DOCUMENTS

| | | | |
|---|---|---|---|
| 4,761,642 | * 8/1988 | Huntzinger ............................ 340/721 |
| 5,363,206 | 11/1994 | Fukushima ............................ 358/440 |
| 5,377,016 | 12/1994 | Kashiwagi et al. ................... 358/403 |
| 5,452,289 | * 9/1995 | Sharma et al. ....................... 370/32.1 |
| 5,532,849 | * 7/1996 | McIntyre et al. ..................... 358/534 |
| 5,535,017 | 7/1996 | Hideaki ................................. 358/444 |
| 5,724,555 | * 3/1998 | Wadsworth .......................... 395/500 |
| 5,764,866 | * 6/1998 | Maniwa ................................ 395/114 |
| 6,134,017 | * 10/2000 | Schlank et al. ..................... 358/1.15 |
| 6,181,823 | * 1/2001 | Takahashi ............................ 382/232 |

OTHER PUBLICATIONS

Patent Abstracts of Japan, vol. 017, No. 032, Jan. 21, 1993 & JP 04 252557 A (Fuji Xerox Co. Ltd.), Sep. 8, 1992.

* cited by examiner

Primary Examiner—Moustafa M. Meky
(74) Attorney, Agent, or Firm—Fitzpatrick, Cella, Harper & Scinto

(57) ABSTRACT

A communication apparatus analyzes data supplied from an information processing terminal, discriminates a function corresponding to the analyzed data, executes data communication with the information processing terminal with respect to the discriminated function, allows to accept another function requested from the information processing terminal during the data communication, and in response to the request, executes in parallel data communication with respect to a plurality of different functions.

24 Claims, 38 Drawing Sheets

FIG. 2

| TYPE | PC | BASIC TERMINAL SERVICE | |
|---|---|---|---|
| | | DATA FLOW | TERMINAL |
| 1 | PRINT REQUEST | → | RECEIVE PRINT DATA TO EXECUTE PRINT PROC |
| 2 | READ DATA REQUEST | ← | TRANSFER SCANNER READ DATA TO HOST |
| 3 | DOCUMENT TRANSMISSION REQUEST | → | RECEIVE TRANSMISSION DOCUMENT DATA TO EXECUTE TRANSMISSION PROC |
| 4 | RECEPTION DOCUMENT REQUEST | ← | TRANSFER RECEPTION DOCUMENT TO HOST |
| ... | ... | ... | ... |

FIG. 4

| FIELD | 1 | 2 | 3 | 4 | 5 | 6 |
|---|---|---|---|---|---|---|
| TYPE 1 | Ln | JOB ID | CONTROL | OUTPUT DEVICE | INPUT DEVICE | DEVICE PARAMETER |
| TYPE 2 | | | | DATA | | |

DATA PACKET FORMAT

FIG. 5

| \multicolumn{4}{c}{DEVICE ID} ||||
|---|---|---|---|
| BIT | DEVICE NAME | OUTPUT DEVICE | INPUT DEVICE |
| 0 | THE ENTIRETY OF SYSTEM | × | × |
| 1 | HOST (PC) | ○ | ○ |
| 2 | RECORDER UNIT | × | ○ |
| 3 | READER UNIT | ○ | × |
| 4 | COMMUNICATION UNIT | ○ | ○ |
| 5 | FILE MANAGEMENT UNIT | ○ | ○ |
| ... | | | |

FIG. 6

| TYPE | DATA TRANSFER QUEUE TO PC | | | | |
|---|---|---|---|---|---|
| 1 | COMMAND/ RESPONSE QUEUE | POINTER 1 | NULL | NULL | .... |
| 2 | TRANSFER DATA QUEUE | POINTER 2 | POINTER 3 | NULL | .... |

FIG. 7

| DEVICE STATUS WITHIN TERMINAL | |
|---|---|
| RECORDER UNIT | IN DATA RECEIVING |
| READER UNIT | IN READING |
| COMMUNICATION CONTROL UNIT | IDLE |
| FILE MANAGEMENT UNIT | MEMORY RESIDUAL 50% |
| | IDLE |

FIG. 9

| NO. | PC | ←--→ | TERMINAL |
|---|---|---|---|
| 1 | STATUS REQUEST | ----→ | |
| 2 | | ←---- | IDLE |
| 3 | PRINT REQUEST | ----→ | |
| 4 | | ←---- | PRINT ACCEPTANCE |
| 5 | PRINT DATA | ----→ | |
| 6 | READ REQUEST | ----→ | |
| 7 | | ←---- | READ ACCEPTANCE |
| 8 | PRINT DATA | ----→ | |
| 9 | PRINT DATA | ----→ | |
| 10 | | ←---- | READ DATA |
| 11 | PRINT DATA | ----→ | |
| 12 | | ←---- | READ DATA |
| 13 | PRINT DATA (END) | ----→ | |
| 14 | | ←---- | READ DATA |
| 15 | | ←---- | READ DATA (END) |
| 16 | STATUS REQUEST | ----→ | |
| 17 | | ←---- | IN PRINTING |
| 18 | STATUS REQUEST | ----→ | |
| 19 | | ←---- | PRINT END |
| 20 | STATUS REQUEST | ----→ | |
| 21 | | ←---- | IDLE |

FIG. 10

BLOCK BUFFER MANAGEMENT TABLE (WE: WRITE ENABLE, W: WRITE USE, RO: READ ONLY)

| NO. | SERVICE | 1 APPLICATION | 1 STATUS | 2 APPLICATION | 2 STATUS | 3 APPLICATION | 3 STATUS | 4 APPLICATION | 4 STATUS |
|---|---|---|---|---|---|---|---|---|---|
| 1 | IDLE | FOR RECORD | WE | ------ | UNUSED | ------ | UNUSED | FOR READ | WE |
| 2 | RECORD | FOR RECORD | W | ------ | UNUSED | ------ | UNUSED | FOR READ | WE |
| 3 | RECORD | FOR RECORD | RO | FOR RECORD | W | ------ | UNUSED | FOR READ | WE |
| 4 | RECORD | FOR RECORD | WE | FOR RECORD | RO | FOR RECORD | W | FOR READ | WE |
| 5 | RECORD | FOR RECORD | W | FOR RECORD | WE | FOR RECORD | RO | FOR READ | WE |
| 6 | RECORD + READ | FOR RECORD | RO | FOR RECORD | W | ------ | UNUSED | FOR READ | W |
| 7 | RECORD + READ | FOR RECORD | W | ------ | UNUSED | FOR READ | W | FOR READ | RO |
| 8 | RECORD + READ | FOR RECORD | RO | FOR READ | W | FOR READ | RO | FOR READ | W |
| 9 | RECORD + READ | FOR RECORD | WE | FOR READ | RO | FOR READ | W | FOR READ | RO |
| 10 | READ | FOR RECORD | WE | FOR READ | W | FOR READ | RO | FOR READ | WE |
| 11 | READ | FOR RECORD | WE | FOR READ | RO | ------ | WE | FOR READ | W |
| 12 | READ | FOR RECORD | WE | ------ | UNUSED | ------ | UNUSED | FOR READ | RO |
| 13 | IDLE | FOR RECORD | WE | ------ | UNUSED | ------ | UNUSED | FOR READ | WE |

FIG. 12

COMPOSITE SERVICE FORM

| TYPE | OUTPUT DEVICE | INPUT SERVICE | SERVICE OUTLINE |
|------|---------------|---------------|-----------------|
| 1 | PC | RECORD + COMMUNICATION | PRINT AND TRANSMIT DOCUMENT FROM PC |
| 2 | COMMUNICATION | RECORD + PC | PRINT POLLING-RECEIVED DOCUMENT AND TRANSFER IT TO PC |
| 3 | SCANNER | PC + COMMUNICATION | TRANSMIT DOCUMENT DATA FROM SCANNER AND TRANSFER IT TO PC |
| 4 | FILE | RECORD + COMMUNICATION | PRINT AND TRANSMIT FILE-STORED DOCUMENT DATA |
| ... | | | |

FIG. 14

FILE MANAGEMENT TABLE

| DOCUMENT NO. | CORRESPONDING SERVICE | FILE ATTRIBUTE | DATA POINTER | JOB ID |
|---|---|---|---|---|
| 001 | RECORD, COMMUNICATION | A4, 2 PAGES, MMR | xxxx | aaa |
| 002 | RECORD, PC | B4, 1 PAGE, MR | yyyy | bbb |
| 003 | NONE | A4, 5 PAGES, BIT MAP | zzzz | ccc |
| ... | | | | |

FIG. 15

SERVICE QUEUE

| MANAGEMENT NO. | KIND OF SERVICE | SERVICE PARAMETER | DOCUMENT NO. | STATUS |
|---|---|---|---|---|
| 001 | RECORD | NONE | 001 | END |
| 002 | TRANSMISSION | DESTINATION NO. | 001 | IN EXECUTING |
| 003 | PC TRANSFER | SERVICE ID | 002 | WAIT |
| ... | | | | |

FIG. 19

| TYPE | DATA TRANSFER QUEUE TO PC | | | | |
|---|---|---|---|---|---|
| 1 | COMMAND/ RESPONSE QUEUE | POINTER 1 | NULL | NULL | .... |
| 2 | PRIORITY DATA QUEUE | POINTER 2 | NULL | NULL | .... |
| 3 | TRANSFER DATA QUEUE | POINTER 3 | POINTER 4 | NULL | .... |

FIG. 20

| DEVICE STATUS WITHIN TERMINAL | |
|---|---|
| RECORDER UNIT | IDLE |
| READER UNIT | IN READING |
| COMMUNICATION CONTROL UNIT | IN RECEPTION PROCESSING |
| FILE MANAGEMENT UNIT | MEMORY RESIDUAL 50% |
| | IN RECEPTION FILE FORMING |
| PRIORITY DATA QUEUE | IN USE BY COMMUNICATION UNIT |

FIG. 23

| NO. | PC | ←--→ | TERMINAL |
|---|---|---|---|
| 1 | READ REQUEST | -----→ | |
| 2 | | ←----- | READ ACCEPTANCE |
| 3 | | ←----- | READ DATA |
| 4 | | ←----- | READ DATA |
| 5 | PRIORITY PROC REQUEST | -----→ | |
| 6 | | ←----- | RESPONSE |
| 7 | RECEPTION DOCUMENT REQUEST | -----→ | |
| 8 | | ←----- | REQUEST ACCEPTANCE |
| 9 | | ←----- | RECEPTION DOCUMENT DATA |
| 10 | | ←----- | RECEPTION DOCUMENT DATA (END) |
| 11 | | ←----- | READ DATA |
| 12 | | ←----- | READ DATA |
| 13 | | ←----- | READ DATA (END) |
| 14 | STATUS REQUEST | -----→ | |
| 15 | | ←----- | IDLE |

FIG. 24

| TYPE | PRIORITY PROC TYPE |
|---|---|
| | PRIORITY SERVICE |
| 1 | EXECUTE PRIORITY PROC ON FORMER-ACCEPTED SERVICE |
| 2 | EXECUTE PRIORITY PROC ON LATER-ACCEPTED SERVICE |
| 3 | SET PRIORITY MODE AT SERVICE ACCEPTANCE |
| 4 | FIX READ SERVICE |
| 5 | FIX RECORD SERVICE |
| 6 | FIX COMMUNICATION SERVICE |
| 7 | FIX FILE SERVICE |

FIG. 38

| JOB ID | STATUS | KIND OF SERVICE | FILE ID | PARAMETER |
|---|---|---|---|---|
| 0001 | END | TRANSMISSION REQUEST | AAAA | PARTNER'S INFORMATION ETC. |
| 0002 | IN EXECUTING | READ REQUEST | IN FORMING | RESOLUTION ETC. |
| 0003 | IN EXECUTING | PRINT REQUEST | BBBB | DATA FORMAT ETC. |
| 0004 | IN EXECUTING | RECEPTION DOCUMENT REQUEST | IN FORMING | FILE ID ETC. |
| 0005 | WAIT | PRINT REQUEST | CCCC | DATA FORMAT ETC. |
| 0006 | WAIT | TRANSMISSION REQUEST | DDDD | PARTNER'S INFORMATION ETC. |
| — | | | | |

COMMUNICATION APPARATUS CONNECTABLE TO INFORMATION PROCESSING TERMINAL SUCH AS PERSONAL COMPUTER

BACKGROUND OF THE INVENTION

1. Field of the Invention

The present invention relates to a communication apparatus connectable to an information processing apparatus such as a personal computer.

2. Related Background Art

As an apparatus of this type, a facsimile apparatus (multi-function terminal apparatus) is known which has a plurality of functions including a reader function, a printer function, and a communication function and is connectable via interface to an information processing terminal. In such a multi-function terminal apparatus, one of a plurality of functions is selected and the selected function is controlled.

However, while one selected function is controlled, service using another function cannot be accepted and processing this function is suspended. Therefore, a conventional multi-function terminal apparatus has not been used efficiently.

A series of services using a plurality of functions is required to be controlled by an information processing apparatus such as a computer. Therefore, a load on the information processing apparatus becomes large.

Furthermore, if a plurality of services accepted at the same time are processed equally, the processing speed lowers considerably as compared to the case wherein only one function is controlled.

SUMMARY OF THE INVENTION

It is an object of the present invention to improve a communication apparatus from the viewpoint of above problems.

It is another object of the present invention to provide a communication apparatus capable of executing a plurality of functions in parallel in response to a request from an information processing terminal.

It is another object of the present invention to provide a communication apparatus capable of executing a plurality of functions in parallel in response to a request from an information processing terminal which is physically connected via one interface to the communication apparatus.

It is another object of the present invention to provide a communication apparatus whose memory can be used efficiently in executing a plurality of functions in parallel in response to a request from an information processing terminal.

The other objects of the present invention will become apparent from the following detailed description of embodiments when read in conjunction with the accompanying drawings.

BRIEF DESCRIPTION OF THE DRAWINGS

FIG. 2 is a diagram illustrating some functions of the facsimile apparatus 50 shown in FIG. 1;

FIG. 4 is a diagram illustrating a packet format of data transferred between a PC 18 and the facsimile apparatus 50;

FIG. 5 is a diagram illustrating the definition contents of device IDs;

FIG. 6 is a diagram illustrating a data transfer queue management table for managing data transfer of PC 18;

FIG. 7 is a diagram illustrating a table for managing the operation status of each device of the facsimile apparatus 50;

FIG. 9 is a diagram illustrating the data transfer sequence between the facsimile apparatus 50 and PC 18;

FIG. 10 is a diagram illustrating a table for managing the use of a buffer memory 4;

FIG. 12 is a diagram illustrating a composite service form;

FIG. 14 is a diagram illustrating a file management table;

FIG. 15 is a diagram illustrating a service management table (service queue);

FIG. 19 is a diagram illustrating a data transfer queue management table for managing data transfer of PC 18;

FIG. 20 is a diagram illustrating a table for managing the operation state of each device on the facsimile apparatus;

FIG. 23 is a diagram illustrating a data transfer sequence between the facsimile apparatus 50 and PC 18;

FIG. 24 is a diagram illustrating types of priority processing services;

FIG. 38 is a diagram showing an example of a job management table of PC;

DETAILED DESCRIPTION OF THE PREFERRED EMBODIMENTS

Embodiments of the invention will be detailed with reference to the accompanying drawings. In the following embodiments, a facsimile apparatus is used as one example of a multi-function terminal apparatus.

[First Embodiment]

Figure 1:
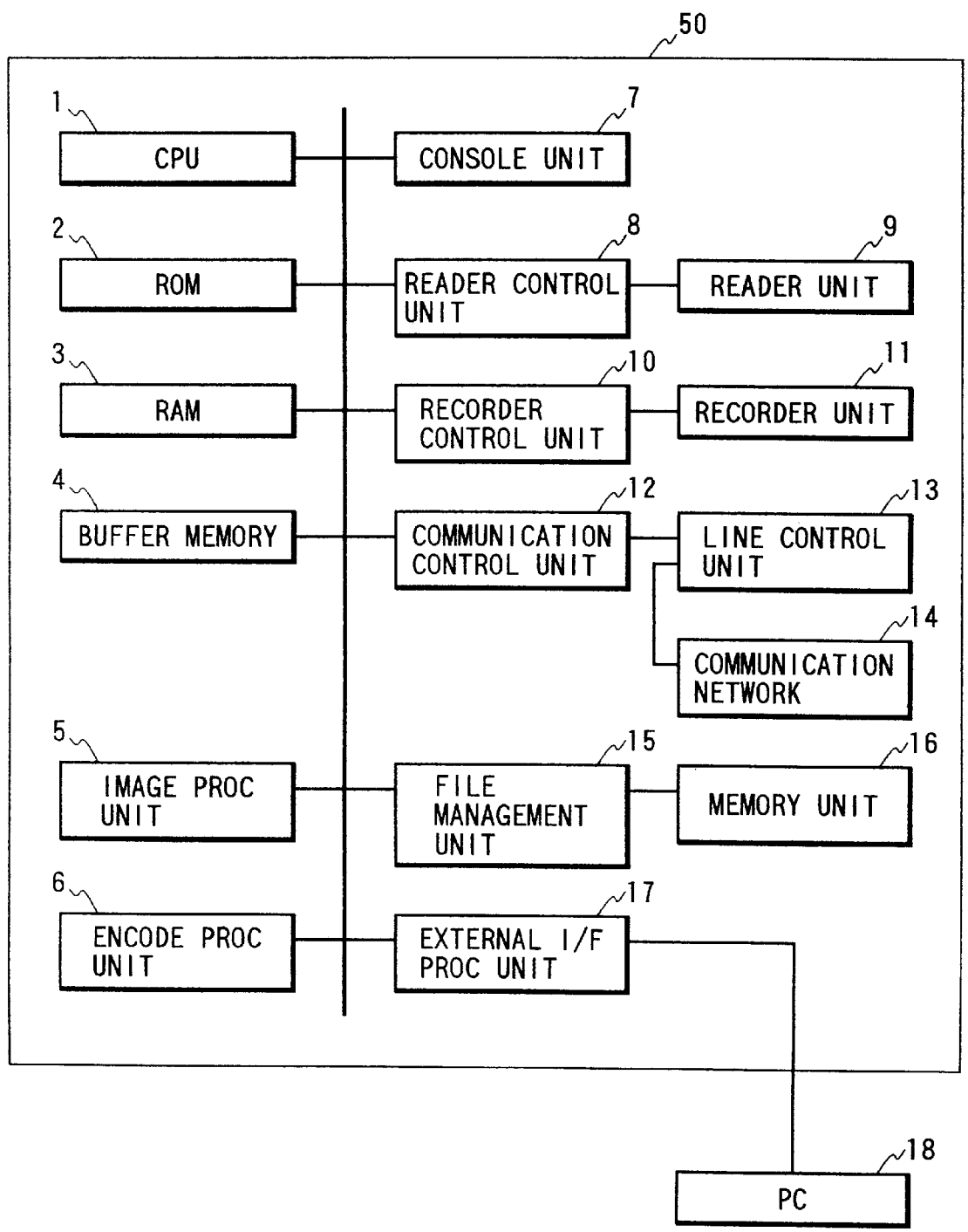
FIG. 1 is a block diagram showing the structure of a facsimile apparatus according to a first embodiment of the invention.

FIG. 1 is a block diagram showing the structure of a facsimile apparatus according to the first embodiment of the invention. The facsimile apparatus 50 has a CPU 1 for controlling the entirety of the apparatus, a ROM 2 for storing control programs and the like, a RAM 3 for temporarily storing various data necessary for the control of the apparatus, a buffer memory 4 which is used for controlling input/output data such as document data, an image processing unit 5 for performing an image data conversion process in accordance with a resolution, a paper size, and the like, an encode processing unit 6 for various encoding and decoding processes, and a console unit 7 for controlling key input, LCD display, and the like.

The facsimile apparatus 50 further includes a reader unit 9 for reading an original, a reader control unit 8 for controlling the reader unit 9, a recorder unit 11 for printing an image, a recorder control unit 10 for controlling the recorder unit 11, a line control unit 13 for controlling a communication procedure of a line connected to a communication network 14, a communication control unit 12 for controlling transmission/reception communications such as G3 and G4 via the line control unit 13, a memory unit 16 for storing transmission/reception documents and the like, a file management unit 15 for managing a file of documents stored in the memory unit 16, and an external I/F processing unit 17 for controlling a communication procedure for a data processing apparatus (hereinafter called a PC) such as a computer.

The operation of the facsimile apparatus 50 of this embodiment will be described. FIG. 2 is an illustrative diagram showing some functions of the facsimile apparatus 50. The functions of the facsimile apparatus 50 include a print request for receiving print data from PC 18 and printing it, a read data request for transferring scanner read data to a host computer, a document transmission request for receiving a transmission document and transmitting it, a reception document request for transferring a reception document to the host computer.

Figure 3:
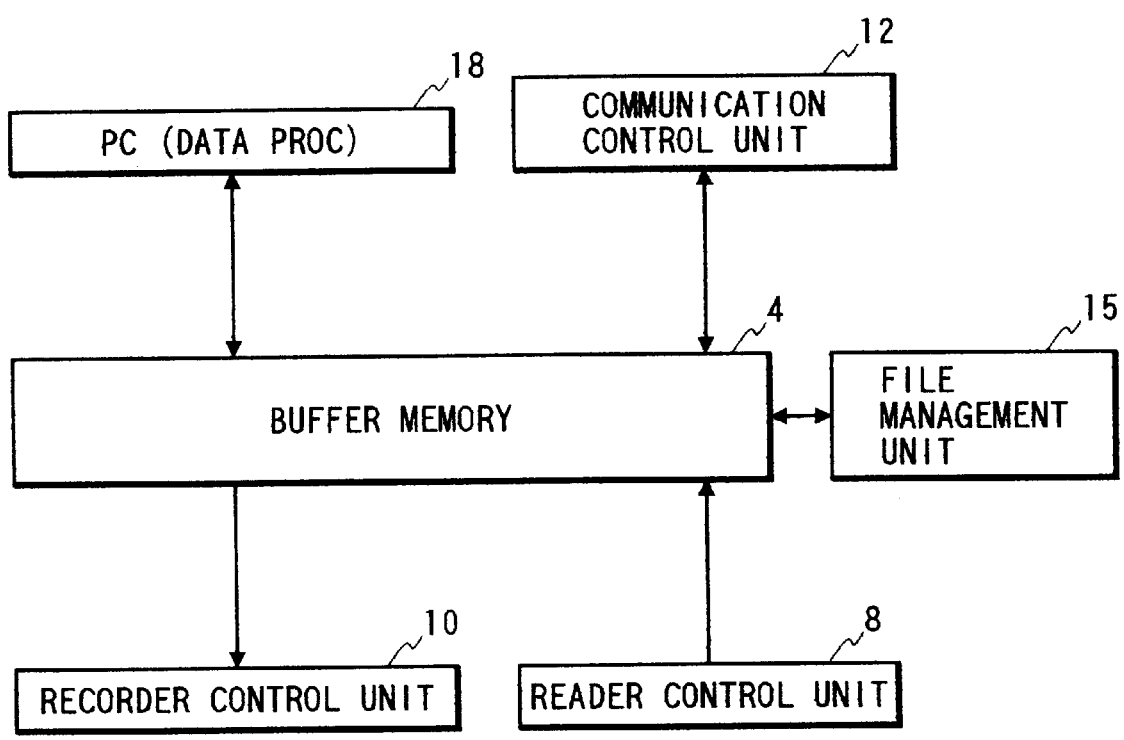
FIG. 3 is a block diagram showing data flow at each portion of the facsimile apparatus.

FIG. 3 is a block diagram showing data flow at each part of the facsimile apparatus 50. The buffer memory 4 performs bi-directional data handling to and from the PC (data processing apparatus) 18, communication control unit 12, and file management unit 15. Data is transferred uni-directionally from the buffer memory 4 to the record control unit 10, and from the reader control unit 8 to the buffer memory 4.

FIG. 4 is a diagram illustrating the packet format of data transferred between the facsimile apparatus 50 and PC 18. In this embodiment, data communication is carried out by using two data packet formats, type 1 and type 2. The type 1 is a format mainly used for processing a command such as a service request and a status request. The type 2 is a format mainly used for communications of data such as document data in various services. Each field of the format is used as in the following. The first field indicates a data length (Ln) of the whole data packet, the second field indicates a job ID for identifying each service, the third field is used as a control information field for managing each data packet flow such as identifying a command and a response, the fourth field is used for designating an output device which is a data source, the fifth field is used for designating a data input device, and the sixth field is used for setting a device parameter of each designated device.

FIG. 5 is a diagram illustrating the definition contents of each device ID. In this embodiment, not only each device of the facsimile apparatus, but also PC 18 is defined as an external device and can be used with the input/output device designating parameter shown in FIG. 4.

FIG. 6 is a diagram illustrating a data transfer queue management table for managing data transfer of PC 18. In this embodiment, data is classified into two types each being independently managed. The first type is a queue which uses command/response data, and the second type is a queue which uses transfer data from each device.

FIG. 7 is a diagram illustrating a table for managing the operation status of each device of the facsimile apparatus 50. In this embodiment, the operation status of the recorder unit 11, reader unit 9, communication control unit 12, and file management unit 15 is collectively managed.

Figure 8:
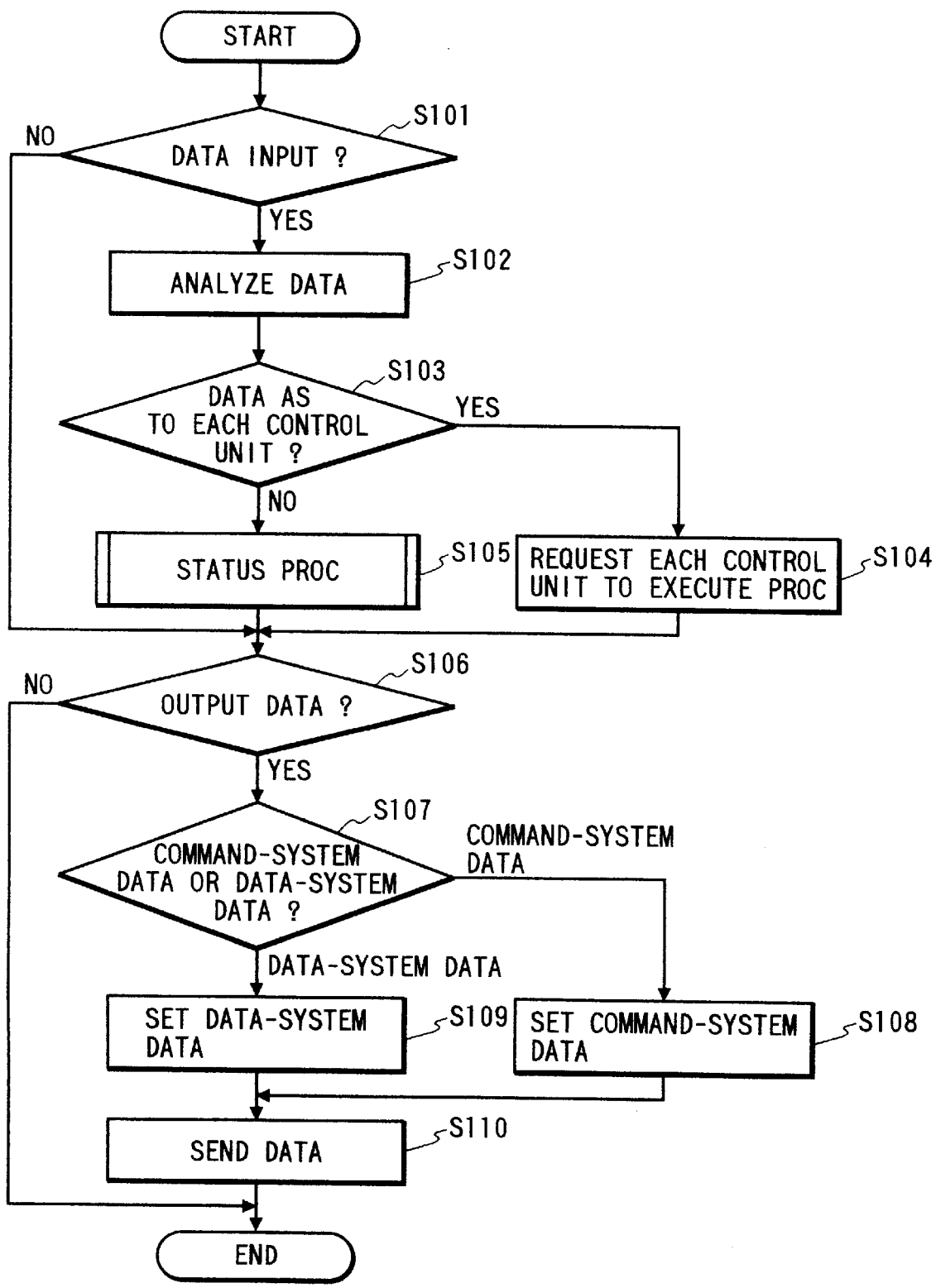
FIG. 8 is a flow chart illustrating the data processing procedure to be executed by the facsimile apparatus 50 for data transfer to and from PC 18.

FIG. 8 is a flow chart illustrating the data processing procedure to be executed by the facsimile apparatus 50 for data transfer to and from PC 18. First, a process of checking data input from PC 18 is performed (Step S101). If there is data input, the flow advances to Step S102, and if not, the flow advances to Step S106. At Step S102 data input from PC 18 is analyzed, and whether the data is for each control unit or for a status processing is checked (Step S103). If the data is for each control unit, each control unit is requested to execute processing (Step S104), whereas if the data is for the status processing, a status processing is executed (Step S105).

In accordance with the received data, each control unit such as reader control unit 8, recorder control unit 10, communication control unit 12, and file management unit 15 performs necessary management such as control of the buffer memory 4 shown in FIG. 3, data registration of the data queue shown in FIG. 6, and registration of the status shown in FIG. 7.

Next, in accordance with the contents of the data transfer queue shown in FIG. 6, a data transfer processing of PC is performed (Step S106). It is checked whether the output data is command-system data or data-system data (Step S107). If there is command-system data to be transferred, a pre-process for the data is executed (Step S109) and the data is sent to PC 18 (Step S110). These processes are periodically executed upon actuation by a timer.

FIG. 9 is a diagram illustrating a data transfer sequence between the facsimile apparatus 50 and PC 18. In FIG. 9, parallel processing is illustrated in which while transferring print data from PC 18 in response to a print request, a read request is issued.

[Second Embodiment]

A facsimile apparatus of the second embodiment will be described. In this embodiment, the structure of hardware of the facsimile apparatus is the same as the first embodiment, and so the description thereof is omitted.

FIG. 10 is a diagram illustrating the management table for managing the use of the buffer memory 4. In order to make it easy to describe the management method, it is assumed that the buffer memory is used only by the reader unit and the recorder unit and that the number of blocks constituting the buffer memory is limited to four so as to use a simplified model. In this management table, use function and status are managed at each block. The status includes the following four types.

(1) "Unused": empty status.
(2) "Write Enable": a predetermined function is assigned for data write.
(3) "Write Use": a data write process is being performed for a predetermined function.
(4) "Read Only": a status waiting for the end of the read process after the write process.

Each block is used in accordance with the following rules. The blocks 1 and 4 are reserved for record and read uses, respectively. For record use, the blocks 1 to 3 are continuously used in the ascending order, and for write use, the blocks 4 to 2 are continuously used in the descending order. Continuity results from the simplified model, and the blocks may be used discontinuously.

Each function module sequentially acquires "Unused" blocks, and after the completion of the read process, the blocks except the blocks 1 and 4 are released immediately. In this manner, the number of blocks used is made variable in accordance with the operation status. Therefore, a single operation can be executed faster, and a plurality of operations can be time divisionally executed.

Figure 11:
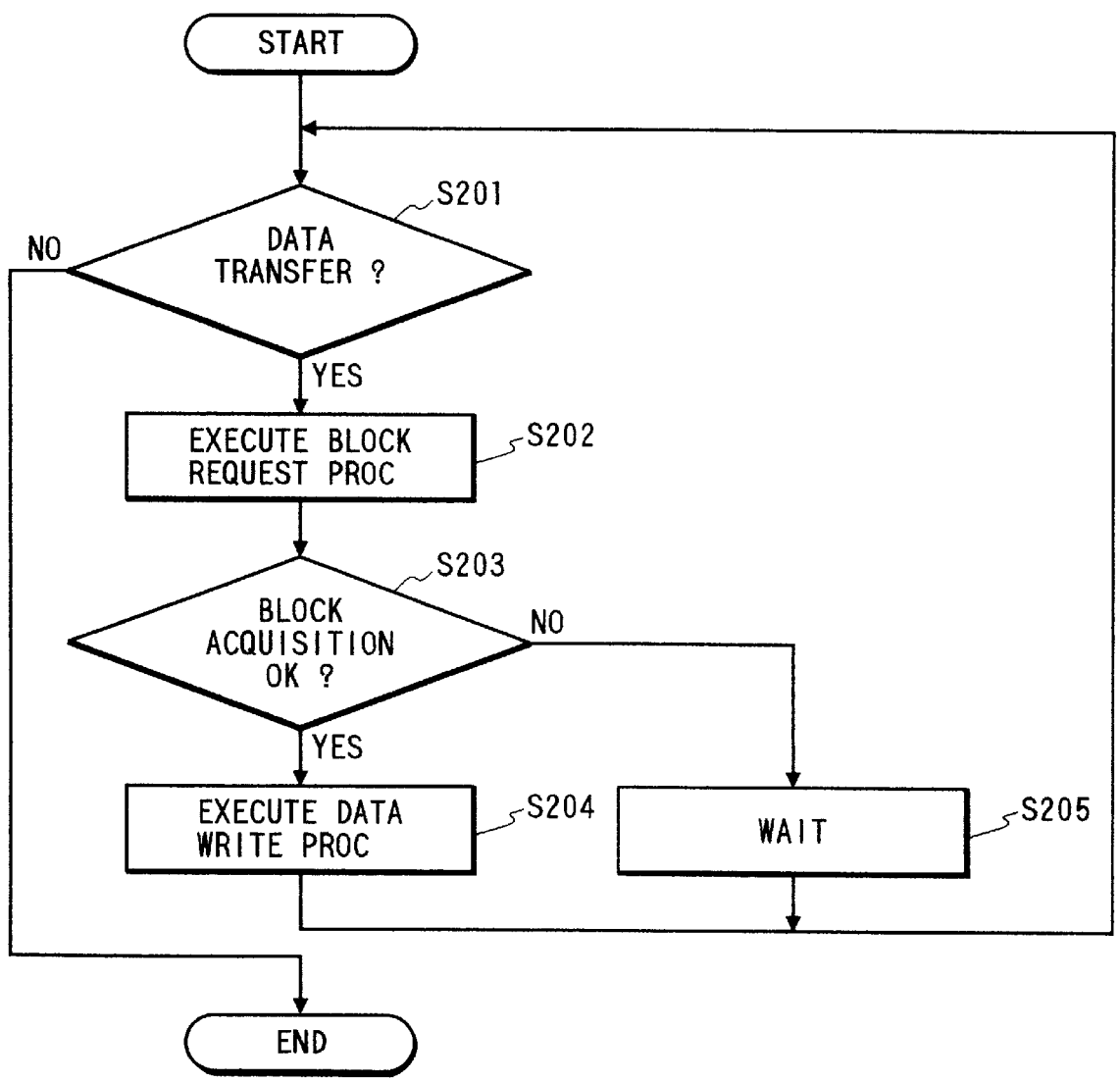
FIG. 11 is a flow chart illustrating a block acquisition procedure by each function module.

FIG. 11 is a flow chart illustrating a block acquisition procedure by each function module. In each function module, it is checked whether there is transfer data (Step S201). If not, this procedure is terminated, whereas if there is transfer data, a block request processing is executed (Step S202). In this case, usable blocks are acquired by using the management table of FIG. 10 (Step S203). If a block can be acquired, a data write processing is executed (Step S204). After the data write, a predetermined data read processing is executed. For example, data in the transfer data queue of FIG. 8 is registered. Thereafter, the procedure returns to Step S201.

If a block cannot be acquired at Step S203, a necessary wait processing is executed (Step S205). In this wait processing, any operation is not executed if appropriate. The procedure returns thereafter to Step S201.

[Third Embodiment]

A facsimile apparatus of the third embodiment will be described. In this embodiment, the structure of hardware of the facsimile apparatus is the same as the first embodiment, and so the description thereof is omitted.

FIG. 12 is a diagram illustrating a composite service form. In this example, how an input/output device is designated for the data packet format (type 1) shown in FIG. 4 and its service outline are illustrated.

Figure 13:
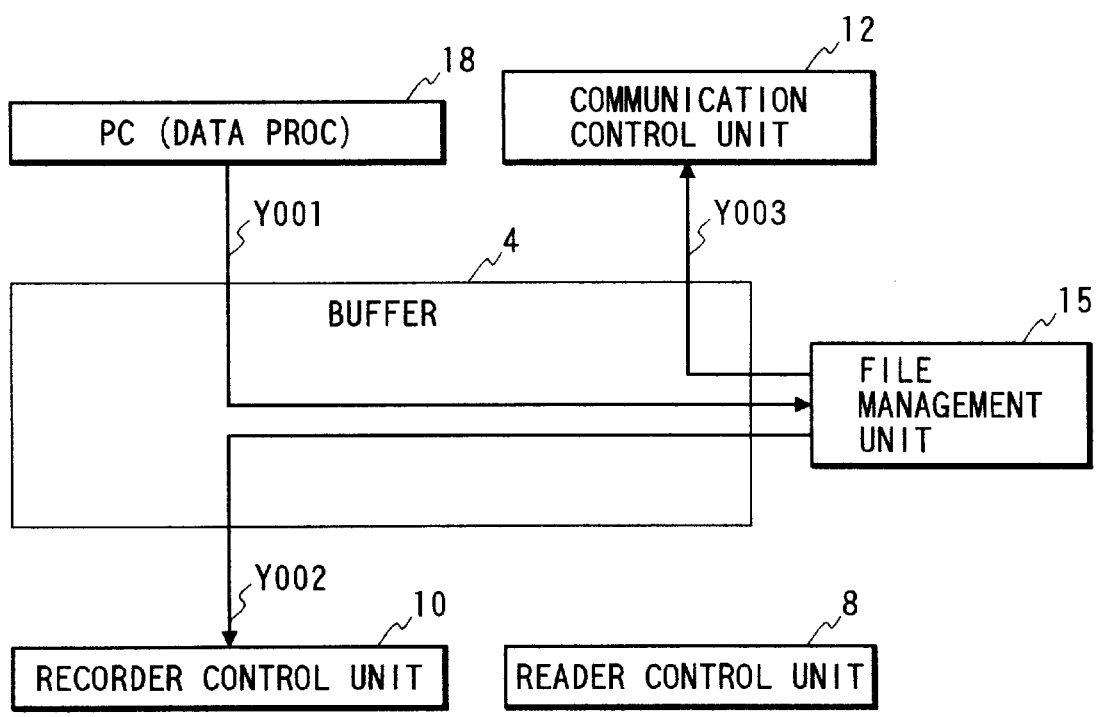
FIG. 13 is a block diagram illustrating data flow between respective control units.

FIG. 13 is a block diagram showing data flow between respective control units. In this example, document data flow controlled for processing the composite service of the type 1 shown in FIG. 12 is illustrated. Document data from PC 18 is sent via the buffer memory 4 to the file management unit 15 for performing file management (Y001). The data is transferred from the file management unit 15 to the recorder control unit 10 via the buffer memory 4 (Y002) for performing record processing.

The same data is transferred from the file management unit 15 to the communication control unit 12 via the buffer memory 4 (Y003) for performing transmission processing. These operations are controlled by the facsimile apparatus 50 as the composite service request from PC 18.

FIG. 14 is a diagram illustrating a file management table. For management of a file, file information is stored in this table, the file information mainly including: a document number for identifying each document, a service type executed for each document, file attributes such as an image size, a resolution, a page number, a data format, respectively of each document, a data pointer indicating a location where document data is stored, and a job ID (the term in the second field shown in FIG. 4) given to PC.

FIG. 15 is a diagram illustrating a service management table (service queue). In controlling each service for a document (FIG. 14) registered in the file management table, a requested service is registered in the service queue to execute the processing. Data managed by the service queue includes a management number identifying each service, a service kind for identifying a service type, a parameter designated for each service, a corresponding document number, and a status for managing a service processing.

Figure 16:
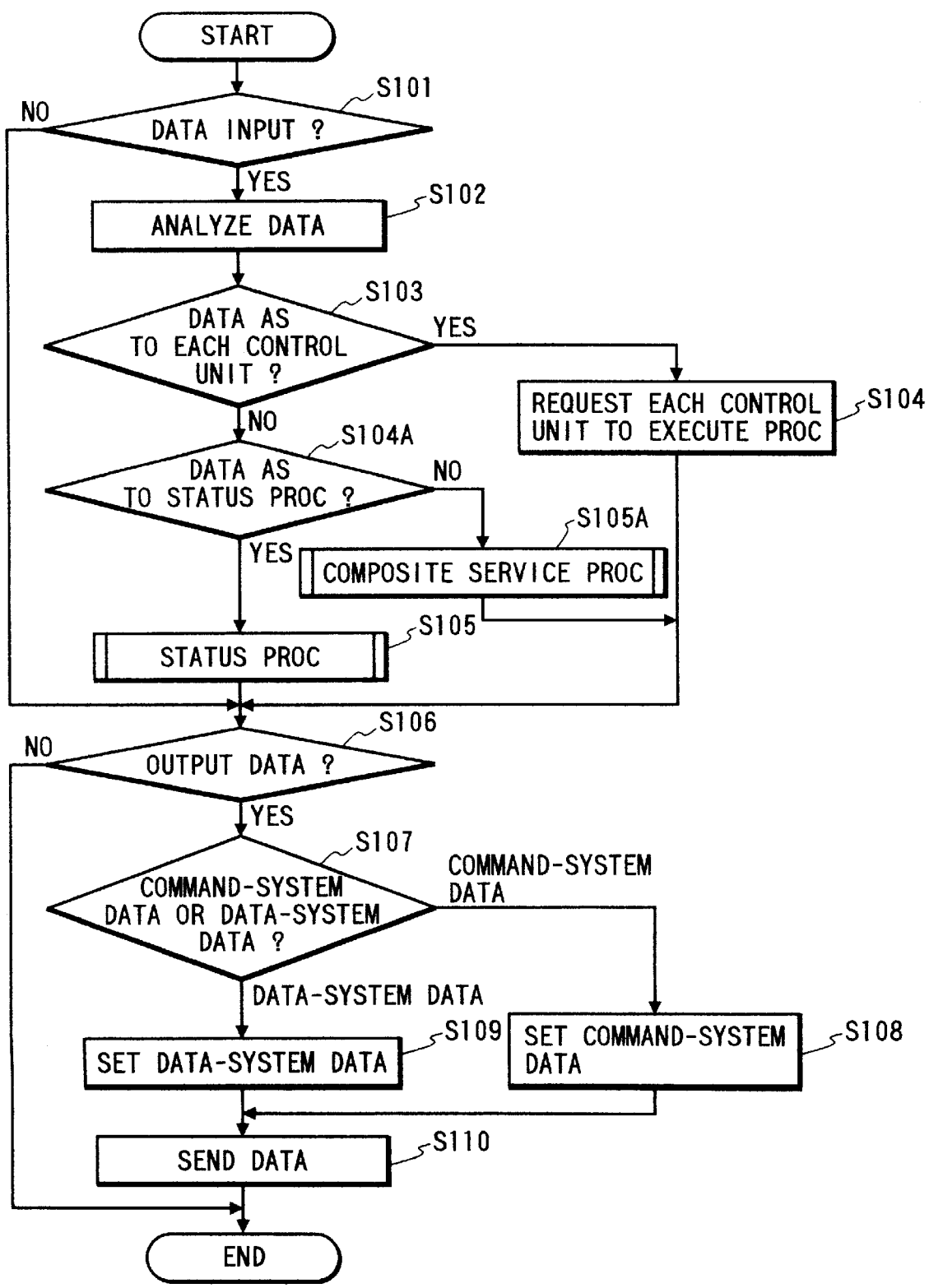
FIG. 16 is a flow chart illustrating a data processing procedure to be executed by the facsimile apparatus 50 for data transfer to and from PC 18.

FIG. 16 is a flow chart illustrating the data processing procedure to be executed by the facsimile apparatus 50 for data transfer to and from PC 18. In this flow chart, similar steps to the first embodiment are represented by identical reference numerals.

First, a process of checking data input from PC 18 is performed (Step S101). If there is data input, the flow advances to Step S102, and if not, the flow advances to Step S106. At Step S102 data input from PC 18 is analyzed, and whether the data is for each control unit or for a status processing is checked (Step S103). If the data is for each control unit, each control unit is requested to execute processing (Step S104). If the data is not for each control unit, it is checked whether the data is for the status processing (step S104A). If the data is for the status processing, a status processing is performed (Step S105), whereas if the data is not for the status processing, a composite service processing is performed (Step S105A).

In accordance with the received data, each control unit such as reader control unit 8, recorder control unit 10, communication control unit 12, and file management unit 15 performs necessary management such as control of the buffer memory 4 shown in FIG. 3, data registration of the data queue shown in FIG. 6, and registration of the status shown in FIG. 7.

Next, in accordance with the contents of the data transfer queue shown in FIG. 6, a data transfer processing of PC is performed (Step S106). It is checked whether the output data is command-system data or data-system data (Step S107). If there is command-system data to be transferred, a pre-process for the data is executed (Step S108), whereas if there is data-system data to be transferred, a pre-process for the data is executed (Step S109), and the corresponding data is sent to PC 18 (Step S110). These processes are periodically executed upon actuation by a timer.

Figure 17:
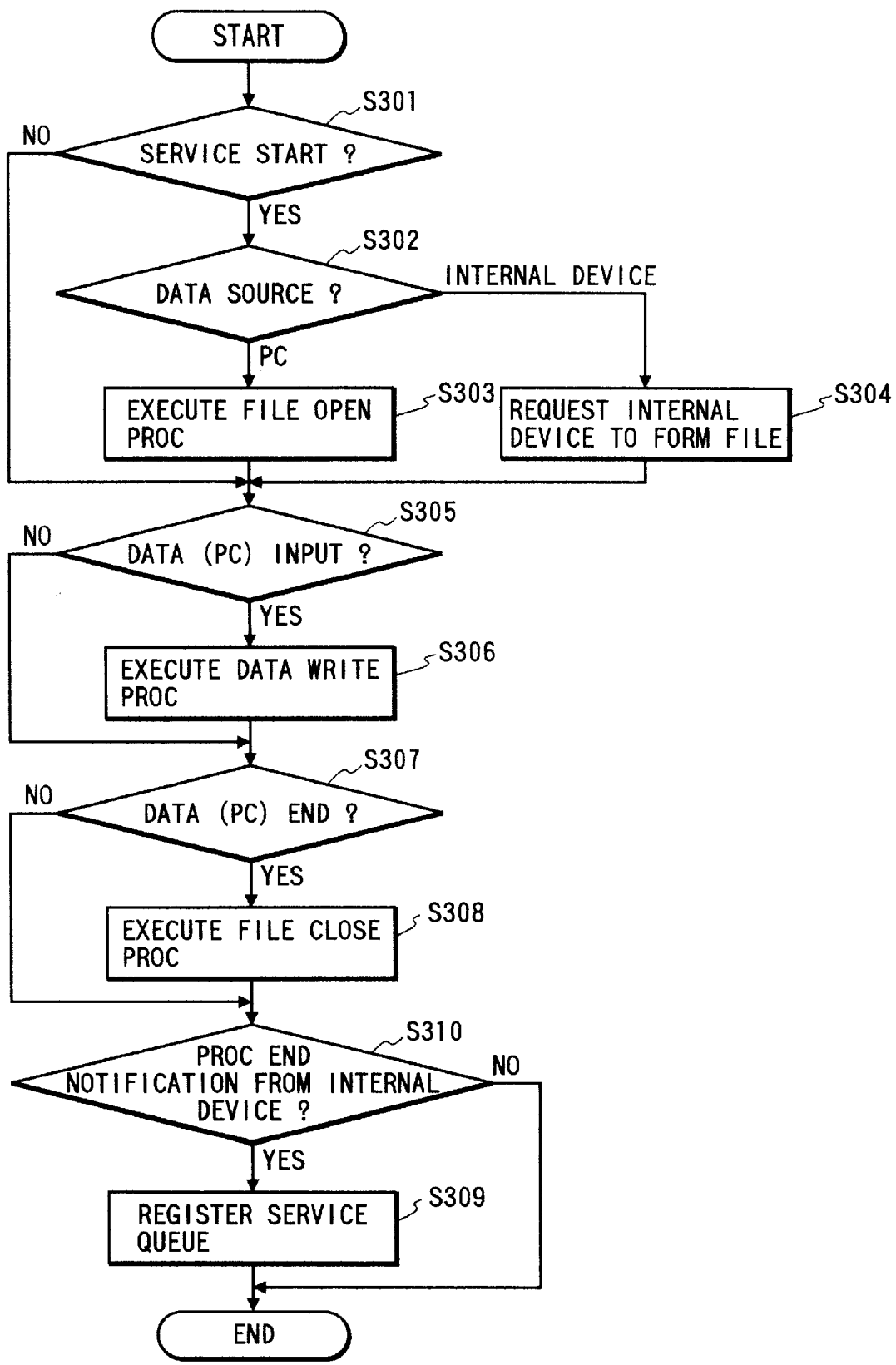
FIG. 17 is a flow chart illustrating the composite service procedure.

FIG. 17 is a flow chart illustrating a composite service procedure. First, a service request is received and it is judged whether the service starts (Step S301). If the service starts, the procedure advances to Step S302, whereas if not, the procedure advances to Step S305. It is judged at Step S302 whether document data is received from PC 18 or it is generated from the internal device. If document data is received from PC 18, the data is received and a file open processing necessary for file management is performed (Step S303).

It is checked whether document data has been received from PC 18 (Step S305). If received, the procedure advances to Step S306, whereas if not, the procedure advances to Step S307. At Step S306, a data write processing is executed. It is checked at Step S307 whether the data from PC 18 has been completed.

If completed, the procedure advances to Step S308, whereas if not, the procedure advances to Step S310. At Step S308 a file close processing is executed and at the same time the document data is registered in the file management table of FIG. 14. Thereafter, the procedure advances to Step S310.

If document data is generated from the internal device at Step S302, a request for making a file of the document data generated under a predetermined internal device control unit (e.g., reader control unit 8) is output (Step S304) to advance to Step S305.

It is judged at Step S310 whether there is a process end notification with respect to the file formation request from the internal device. If there is the process end notification, the service queue of FIG. 15 is registered (Step S309) to terminate this procedure. If there is no process end notification at Step S310, this procedure is terminated.

Figure 18:
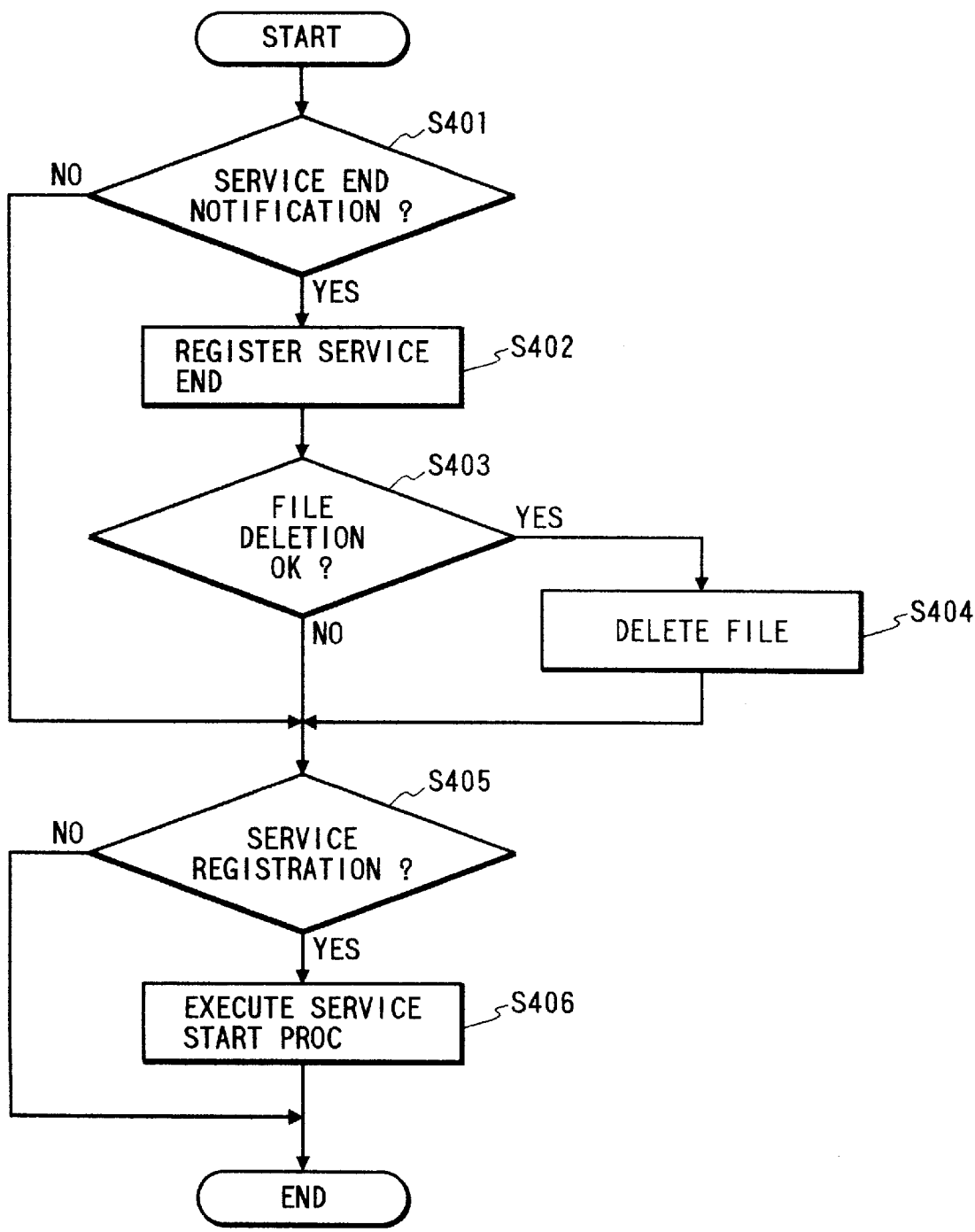
FIG. 18 is a flow chart illustrating a service queue processing procedure.

FIG. 18 is a flow chart illustrating a service queue processing procedure. It is checked at Step S401 whether there is a service end notification corresponding to a service request. It there is the service end notification, the procedure advances to Step S403, whereas if not, the procedure advances to Step S405. A service end is registered in the service queue of FIG. 15 (Step S402), and it is checked whether the used document is not reserved by another service and can be deleted (Step S403). If the used document can be deleted, a file delete processing is executed.

Registration of the service queue is confirmed (Step S405). If there is a service still not processed (in a wait state), a service is issued to a predetermined control unit (Step S406). These processes are periodically executed upon actuation of a timer.

[Fourth Embodiment]

A facsimile apparatus of the third embodiment will be described. In this embodiment, the structure of hardware of the facsimile apparatus is the same as the first embodiment, and so the description thereof is omitted.

FIG. 19 is a diagram illustrating a data transfer queue management table for managing data transfer of PC 18. The data type is classified into three types for managing it independently. The first type is a queue for use with command/response, the second type is a queue for preferential use with data communication among other queues for use with data from various devices, and the third type is a queue for use with data from various usual devices. These queues are selectively used for data communication with PC 18. Specific use will be later described.

FIG. 20 is a diagram illustrating a table for managing the operation status of each device of the facsimile apparatus 50. In this embodiment, the operation status and priority data queue of the recorder unit 11, reader unit 9, communication control unit 12, and file management unit 15 are collectively managed.

Figure 21:
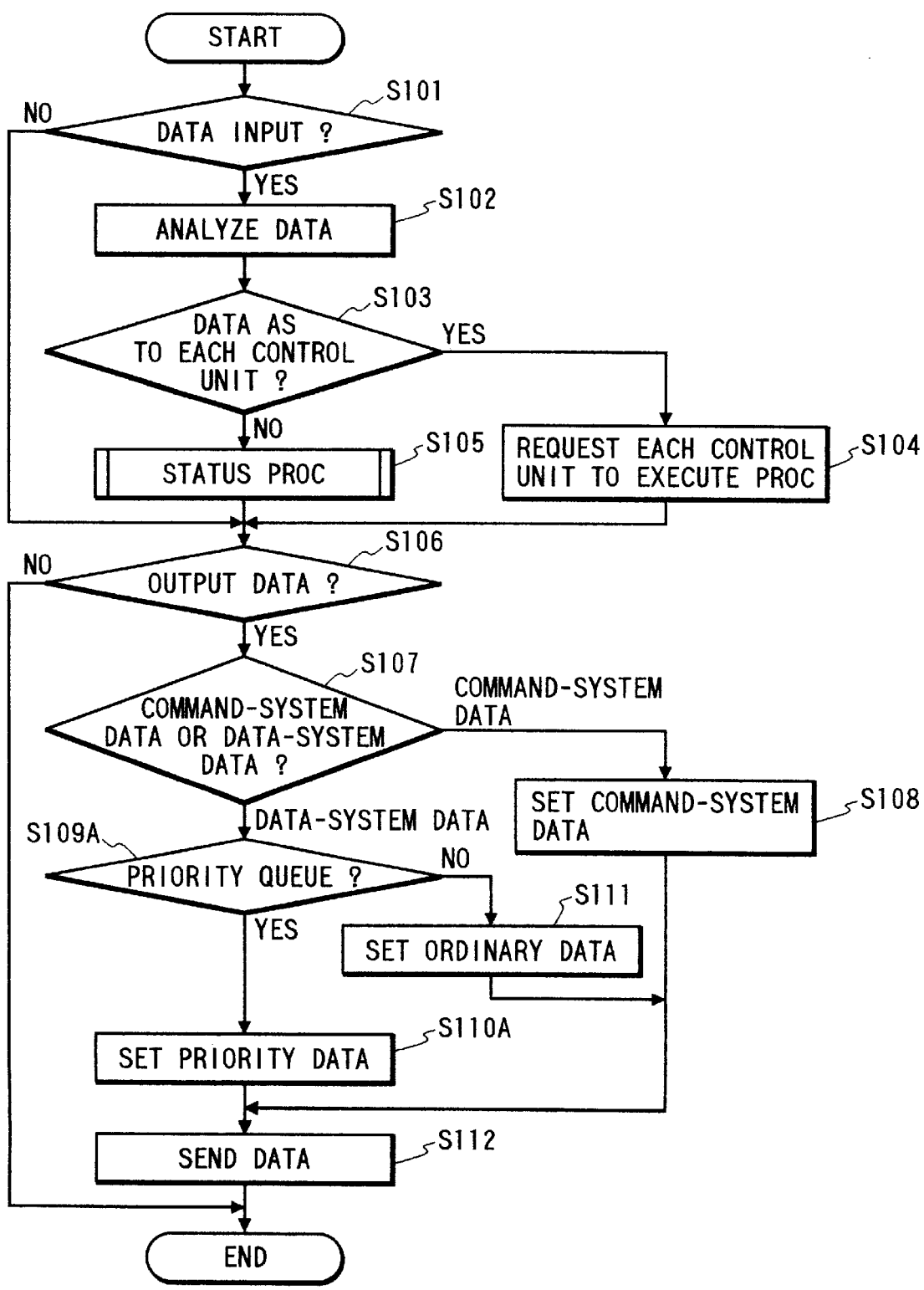
FIG. 21 is a flow chart illustrating a data processing procedure to be executed by the facsimile apparatus 50 for data transfer to and from PC 18.

FIG. 21 is a flow chart illustrating the data processing procedure to be executed by the facsimile apparatus 50 for data transfer to and from PC 18. First, a process of checking data input from PC 18 is performed (Step S101). If there is data input, the flow advances to Step S102, and if not, the flow advances to Step S106. At Step S102 data input from PC 18 is analyzed, and whether the data is for each control unit or for a status processing is checked (Step S103). If the data is for each control unit, each control unit is requested to execute processing (Step S104), whereas if the data is for the status processing, a status processing is executed (Step S105).

In accordance with the received data, each control unit such as reader control unit 8, recorder control unit 10, communication control unit 12, and file management unit 15 performs necessary management such as control of the buffer memory 4 shown in FIG. 3, data registration of the data queue shown in FIG. 6, and registration of the status shown in FIG. 7.

Next, in accordance with the contents of the data transfer queue shown in FIG. 19, a data transfer processing of PC is performed (Step S106). It is checked whether the output data is command-system data or data-system data (Step S107). If there is command-system data to be transferred, a pre-process for the data is executed (Step S108), and if there is data-system data, it is checked whether there is data registered in a priority queue (Step S109A). If there is data in the priority queue, a pre-process for the data is executed (Step S110A), whereas if not, a preprocess for usual data queue is executed (Step S111). The data is sent to PC 18 (Step S112). These processes are periodically executed upon actuation by a timer.

Figure 22:
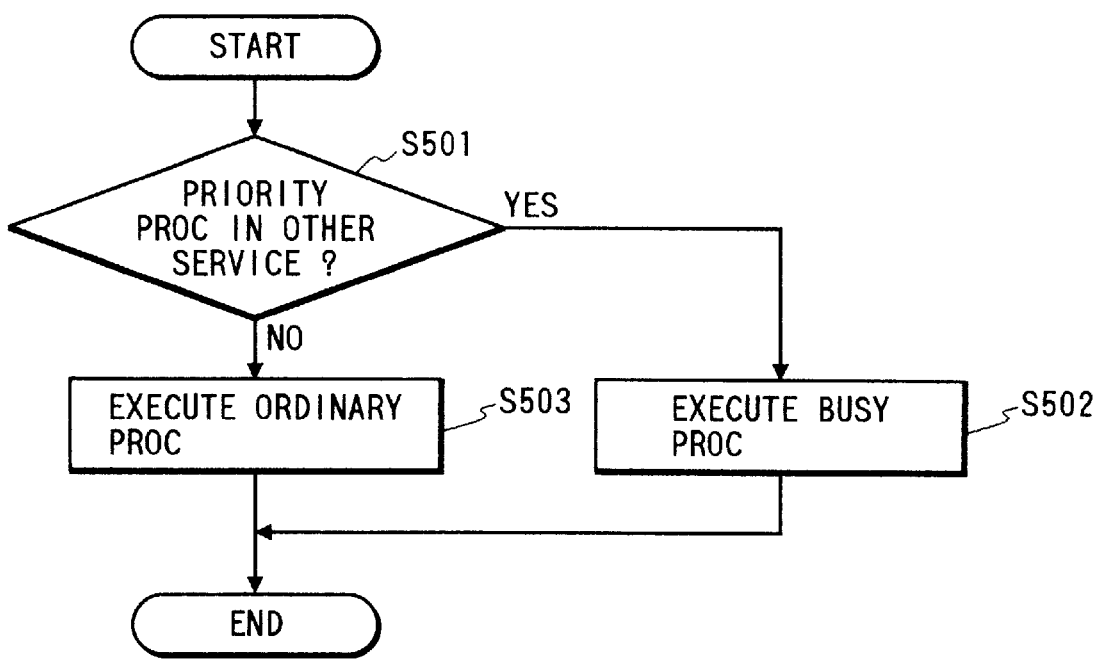
FIG. 22 is a flow chart illustrating a priority processing procedure by each function module.

FIG. 22 is a flow chart illustrating a priority processing procedure of each function module. In controlling a service at each function module such as reader control unit 8 and recorder control unit 10, it is checked from the device status of FIG. 20 whether a priority service has been set (Step S501). If a priority processing is being executed for another service, a busy processing is executed (Step S502). If not, a usual processing is carried out (Step S503). After Step S502 or S503, this procedure is terminated.

FIG. 23 is a diagram illustrating a data transfer sequence between the facsimile apparatus 50 and PC 18. In this data transfer sequence, during data transfer for a read request from PC 18, a priority processing request is issued and thereafter (No. 10 in FIG. 23), the read data transfer continues.

FIG. 24 is a diagram illustrating types of priority processing services. The types are mainly classified into a mode (type) for receiving a designation of a priority processing when a service is received and another type for presetting a priority processing mode and executing the preset priority processing. Which mode is used is selected by the console unit 7 or by settings of a dip switch.

Figure 25:
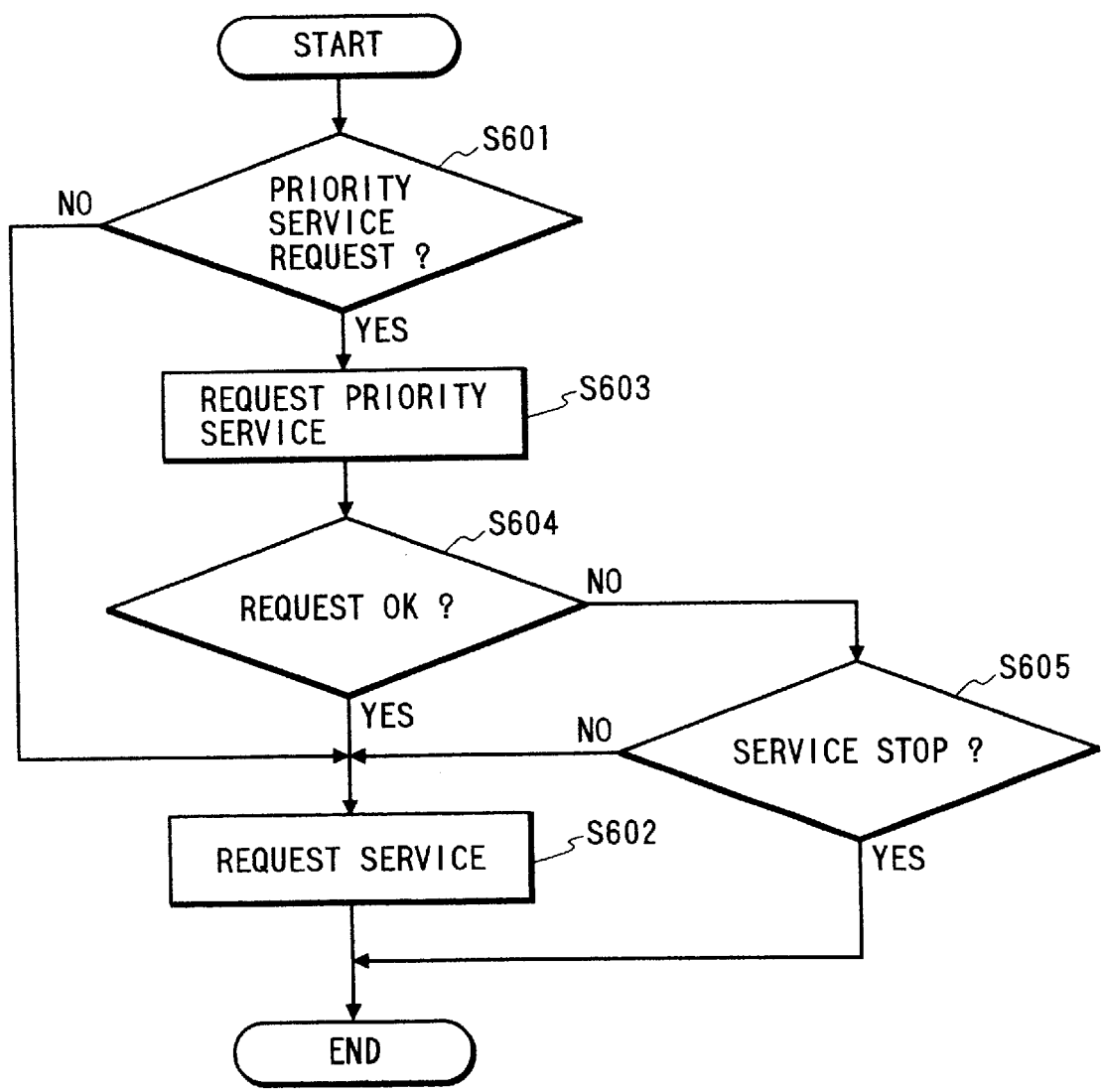
FIG. 25 is a flow chart illustrating a priority service requesting procedure by PC 18.

FIG. 25 is a flow chart illustrating a procedure of requesting a priority service from PC 18. In this example, when PC 18 requests a service, it requests a priority processing mode. First, it is checked whether a priority processing mode is requested (Step S601). If not, a predetermined service request is performed (Step S602) to terminate this procedure.

If a priority service is requested, the priority service request is issued to the facsimile apparatus 50 (Step S603) to judge whether the facsimile apparatus 50 can accept the priority mode (Step S604). If accepted, an actual service request processing is performed (Step S602), whereas if not, the service request is continued or stopped (Step S605). If continued, a service request processing is executed (Step S602) to terminate this procedure, whereas if stopped, the procedure is directly terminated.

[Fifth Embodiment]

Figure 26:
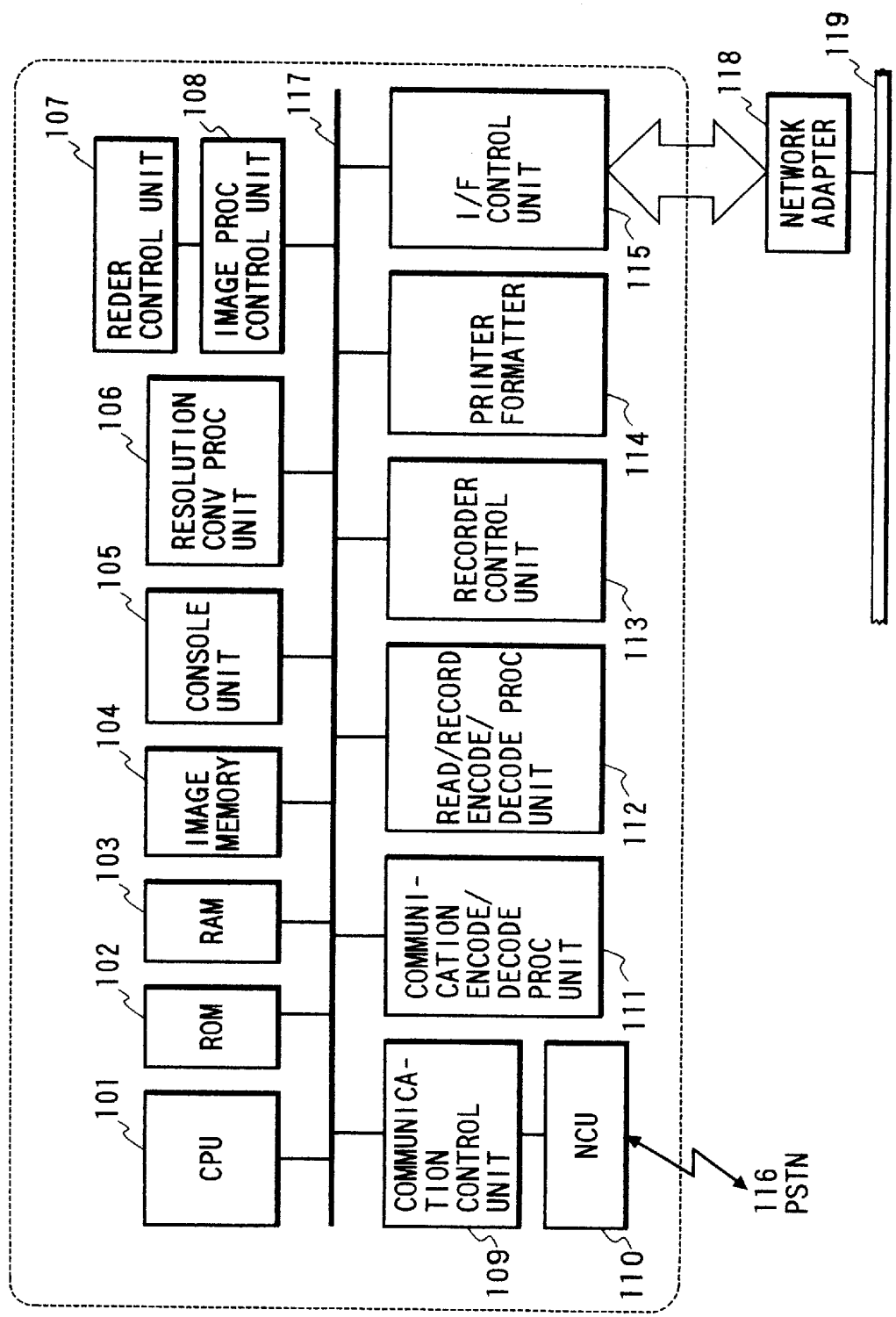
FIG. 26 is a block diagram showing the structure of a facsimile apparatus according to another embodiment of the invention.

FIG. 26 is a block diagram showing the structure of a facsimile communication system according to the fifth embodiment of the invention.

A CPU 101 functions as a system control unit for controlling the entirety of the facsimile system via a system bus 117, and is constituted of a microcomputer and the like.

A ROM 102 stores a control program for CPU 101, an operating system (OS) program, and the like.

A RAM 103 is constituted of an SRAM or the like and stores program controlling variables and the like. RAM 103 also stores values set by an operator, system management data, and various working buffers.

An image memory 104 is constituted of a DRAM or the like and stores image data.

In this embodiment, each control program stored in ROM 102 is executed under software control, such as scheduling and task switches, and under the management of OS stored in ROM 102.

A console unit 105 is constituted of various keys, LEDs, LCDs, and the like and displays various input operations by an operator, operation status of the facsimile communication system, and the like.

A reader control unit 107 is constituted of a CS (tight contact type) image sensor, an original transfer mechanism, and the like. The reader control unit 107 optically reads an original with the CS image sensor, and converts it into electrical data. An image processing control unit 108 performs various image processing such as binarization and half tone processing, and outputs very fine image data. The converted image data is encoded in accordance with a predetermined encoding method by a read/record encode/decode processing unit 112, and stored in the image memory 104.

A recorder control unit 113 is constituted of a page printer, a record image processing control unit, and the like. The recorder control unit 113 controls to decode the record image data at the read/record encode/decode processing unit 112, and the record image processing control unit performs smoothing and record density correcting processing to convert the image data into very fine image data and outputs it to the page printer.

A printer formatter 114 develops printer description language transferred via an I/F control unit 115 into image data. The developed image data is sequentially transferred to the record control unit 113 for record control.

A communication control unit 109 is constituted of a MODEM (modulator/demodulator) and the like and performs modulation/demodulation control for facsimile transmission/reception signals.

An NCU (network control unit) 110 sends a select signal (dial pulse or tone dial signal) to an analog communication line (PSTN) 116 and performs automatic reception line control by detecting a call signal from PSTN. The image data stored in the image memory 104 is decoded by the communication encode/decode processing unit 111 and subjected to a mili-inch resolution conversion and magnification/reduction processing at a resolution conversion processing unit 106. The resolution converted image is encoded for transmission control at the communication encode/decode processing unit 111 so as to match an ability of the transmission partner.

The I/F control unit 115 performs interface control with a network adapter 118 for connection to a LAN. In this embodiment, this I/F control unit 115 is compatible with parallel interface such as bidirectional Centronics interface (parallel interface in conformity with IEEE P1284).

The network adapter 118 is connected to LAN 119, and periodically inquires a FAX server (information processing terminal) on LAN as to remote operation request for transmission and printing so as to control data transmission/reception.

For remote operations of the facsimile apparatus, such as transmission, printing, and data registration, from the FAX server (information processing terminal) via the network adapter 118, predetermined commands, parameters, data, and the like are transmitted to the facsimile apparatus via the I/F control unit 115. In this embodiment, the FAX server (information processing terminal) is installed with application software and driver software for controlling remote operations and remote operation requests.

Figure 27:
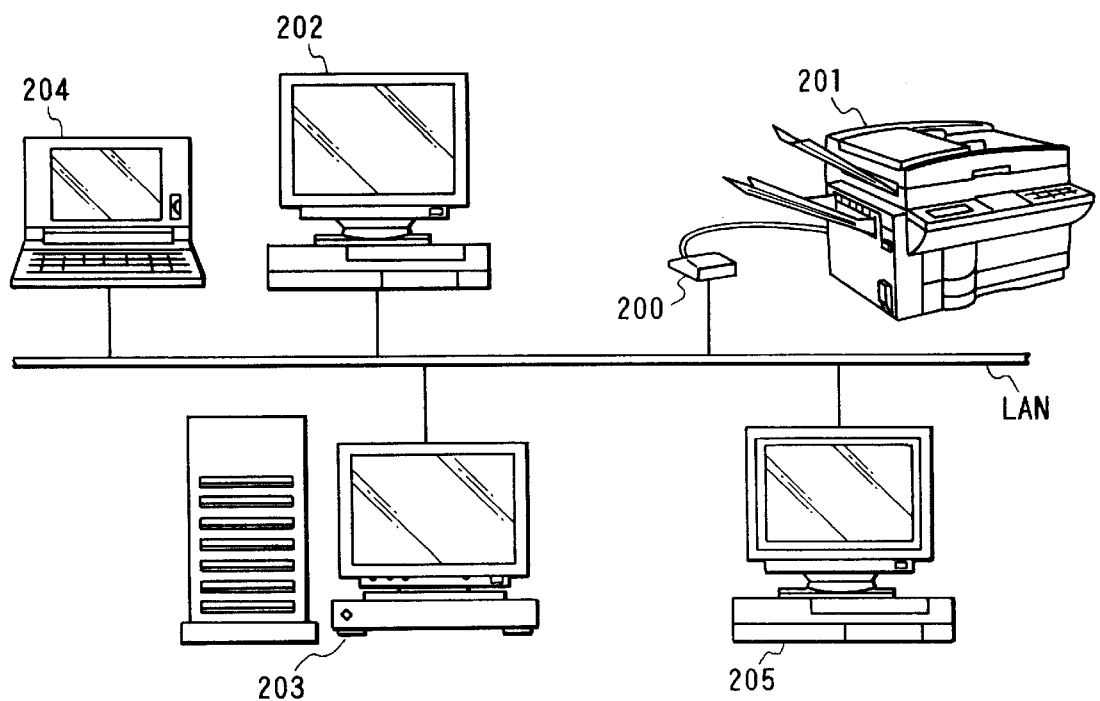
FIG. 27 is a diagram showing an example of connections of a system according to an embodiment of the invention.

FIG. 27 is a diagram illustrating connections of the system of this embodiment.

Reference numeral 200 represents a network adapter (network adapter 118 shown in FIG. 1) for interconnecting LAN and a facsimile apparatus.

Reference numeral 201 represents a facsimile apparatus (FIG. 1) connectable to an external information processing terminal on LAN of this embodiment.

Reference numeral 202 represents a FAX server (information processing terminal) for receiving a facsimile transmission request and a print request from a client terminal on LAN and controlling the remote operations of the facsimile apparatus 201 connected to LAN.

Reference numeral 203 represents a file server for managing a LAN protocol and files on LAN.

Reference numerals 204 and 205 represent client terminals (terminal equipments 1 and 2) connected to LAN.

For the facsimile transmission control of this embodiment, the terminal equipment 1 (204) logs in the FAX server 202 and issues a facsimile transmission request to the FAX server 202 via the network adapter 200 to automatically start a remote operation of the facsimile apparatus 201. In this embodiment, the client terminal on LAN performs a remote operation of the facsimile apparatus via the FAX server 202. If the client terminal is installed with an application program for remote control of the facsimile apparatus by the FAX server, the client terminal can perform a remote operation of the facsimile apparatus via the network adapter 200.

Figure 28:
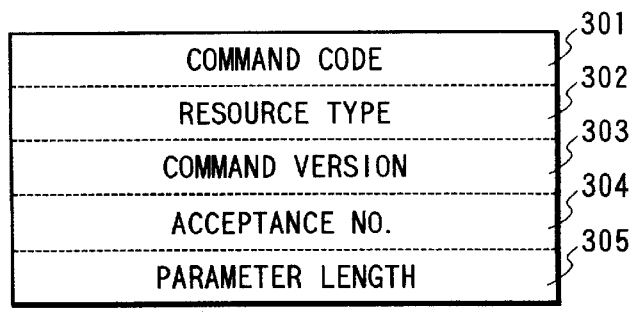
FIG. 28 is a diagram showing the structure of a header of a command received from the information processing terminal of this embodiment.

FIG. 28 shows the outline of the structure of a header of a command received by the facsimile apparatus of this embodiment from the information processing terminal via the network adapter. In this embodiment, the header is used in common for all commands, and parameters such as a record mode and image data are added to this header.

A command code 301 indicates the type of a command. In accordance with this code, the facsimile apparatus performs a predetermined processing.

A resource type 302 stores the type of resource used for multi-services of this embodiment. In accordance with this type, the facsimile apparatus execute in parallel a plurality of services. The resource type of this embodiment is classified into scan, print, FAX transmission, FAX reception, and status notification.

A command version 303 indicates the version of a command. In accordance with the command code and command version, processing for added parameters is executed.

An acceptance number 304 is a number for identifying an accepted service of the information processing terminal.

A parameter length 305 indicates the size of added parameters.

Figure 29:
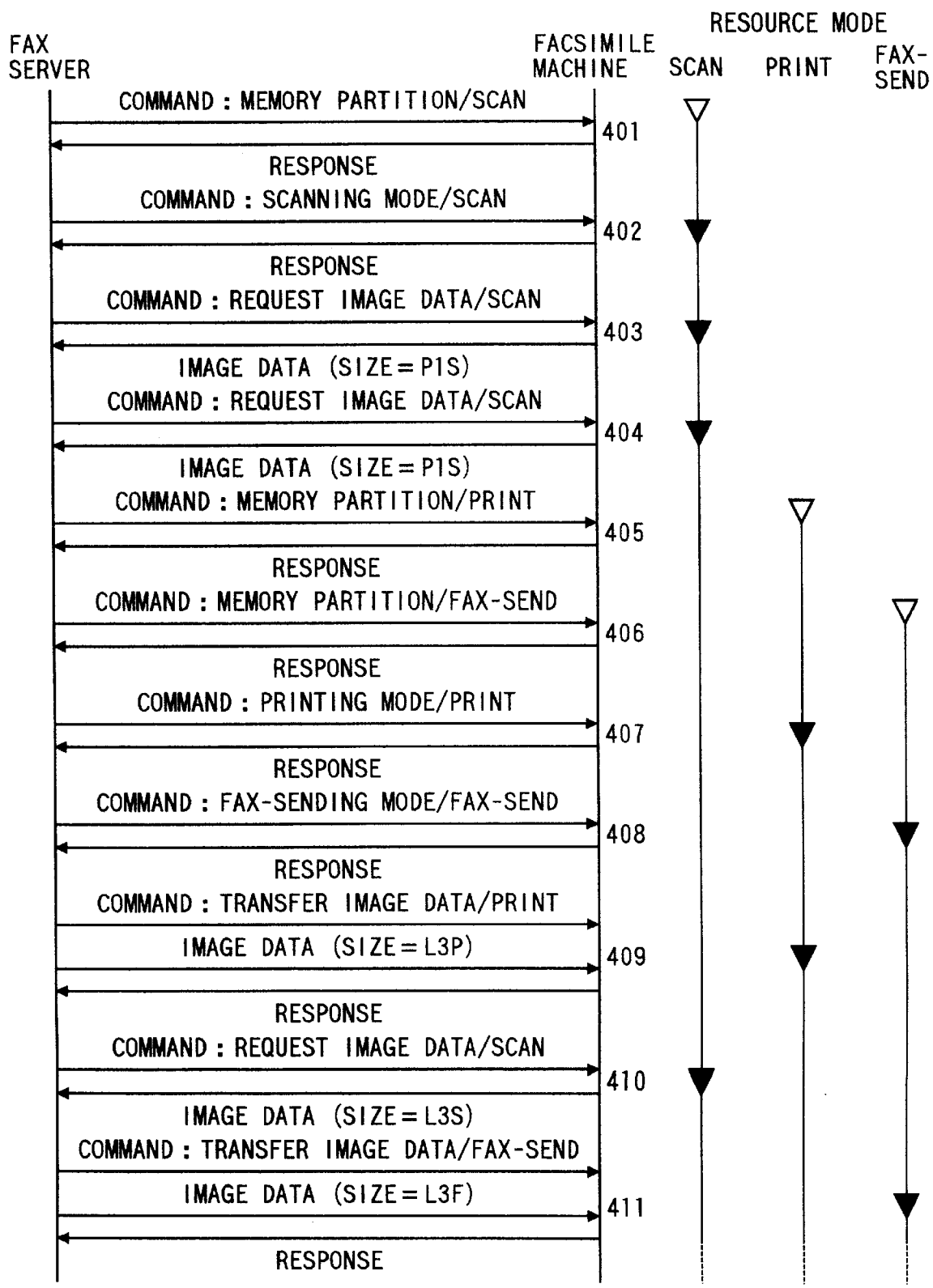
FIG. 29 is a diagram showing the outline of a command sequence of a multi-service operation of the facsimile apparatus of the embodiment.

FIG. 29 is a diagram illustrating the outline of a command sequence of multi-service operations of this embodiment. In this example, three operations including a scan operation, a print operation, and a FAX transmission operation are executed at the same time.

The scan operation of this embodiment is performed by using a memory partition command 401 for reserving a scan area in the image memory of the facsimile apparatus, a scan mode setting command 402 for setting a mode such as a read resolution, a multi-value, a binary value, and the like, and data transfer request commands 404 and 410 for sequentially transferring image data read by the facsimile apparatus to the information processing terminal. In this embodiment, the image data read by the reader control unit of the facsimile apparatus is temporarily stored in the image memory of the facsimile apparatus, and the image data stored in the image memory is sequentially transferred to the information processing terminal. Therefore, read control and transfer control operate synchronously with each block of the image memory.

The print operation of this embodiment is performed by using a memory partition command 405 for reserving a print area in the image memory of the facsimile apparatus, a print mode setting command 407 for setting a mode such as a recording sheet size and the number of copies to be recorded, and a data transfer request command 409 for sequentially transferring image data to be printed to the facsimile apparatus. In the print operation of this embodiment, the image data transferred from the information processing terminal is temporarily stored in the image memory of the facsimile apparatus, and when the image data of one page is stored, the record control starts.

The facsimile transmission operation of this embodiment is performed by using a memory partition command 406 for reserving a facsimile transmission area in the image memory of the facsimile apparatus, a facsimile transmission mode setting command 408 for setting a mode of designating a partner telephone number, header information for facsimile transmission, and the like, and a data transfer request command 411 for sequentially transferring image data to be transmitted to the facsimile apparatus. In the facsimile transmission operation of this embodiment, the image data transferred from the information processing terminal is temporarily stored in the image memory of the facsimile apparatus, and after the communication control starts, the image data stored in the image memory is transmitted to the image memory.

The multi-service control of this embodiment is performed by transferring a command for each operation in a time sharing manner between the information processing terminal and the facsimile apparatus. The resource type of each command is set with a code corresponding to each operation.

Figure 30:
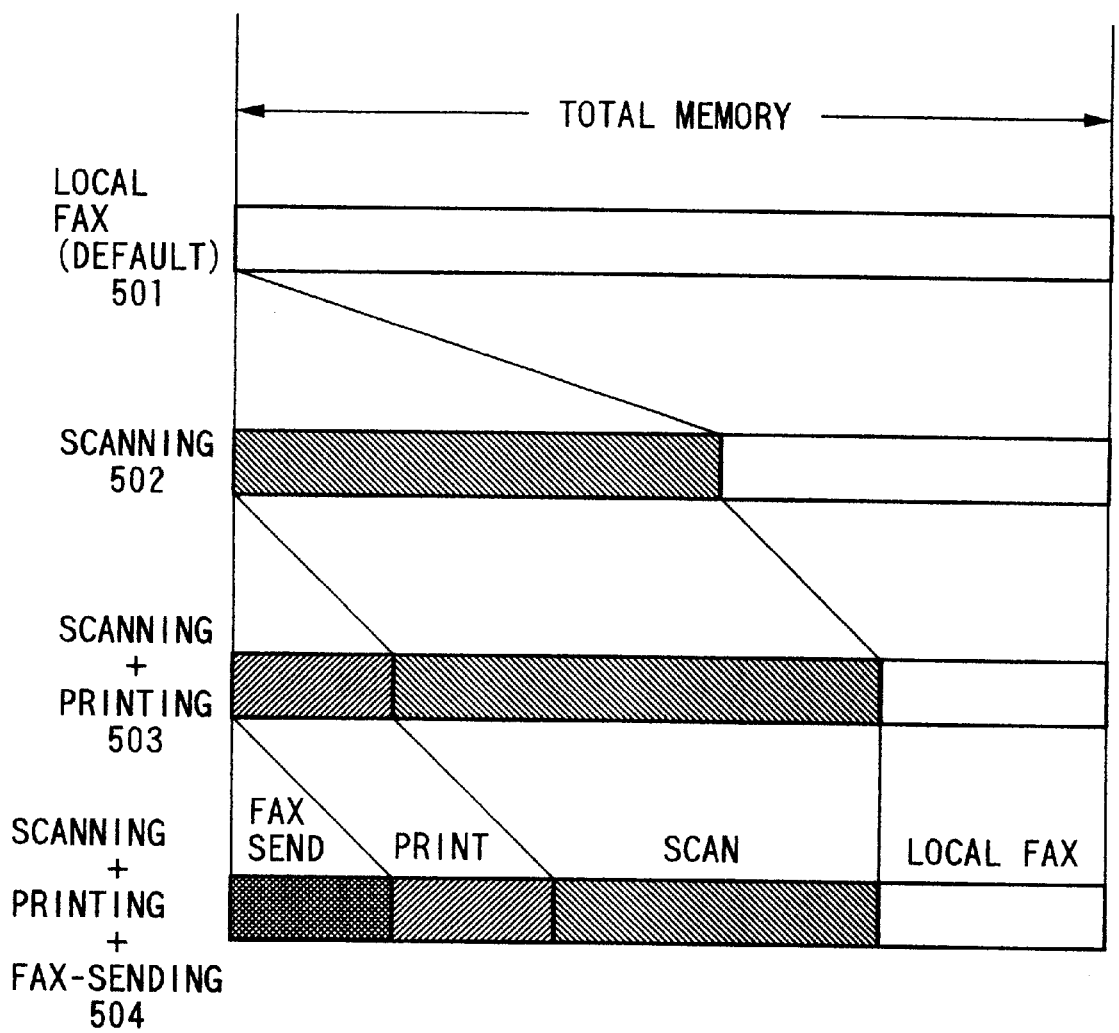
FIG. 30 is a diagram showing the outline of partition control of an image memory of the facsimile apparatus of this embodiment.

Next, the outline of the partition control of the image memory of this embodiment will be described with reference to FIG. 30.

In this embodiment, the facsimile apparatus in a standby state is assigned the whole area of the image memory for the local operation (usual facsimile operation) and facsimile reception (501).

502 indicates the outline of an assignment of the image memory at the start of a scan operation, this assignment being set by the memory partition command sent from the information processing terminal.

503 indicates the outline of an assignment of the image memory when the scan operation and print operation are executed in parallel. 504 indicates the outline of an assignment of the image memory when the facsimile transmission operation, scan operation, and print operation are executed in parallel.

Figure 31:
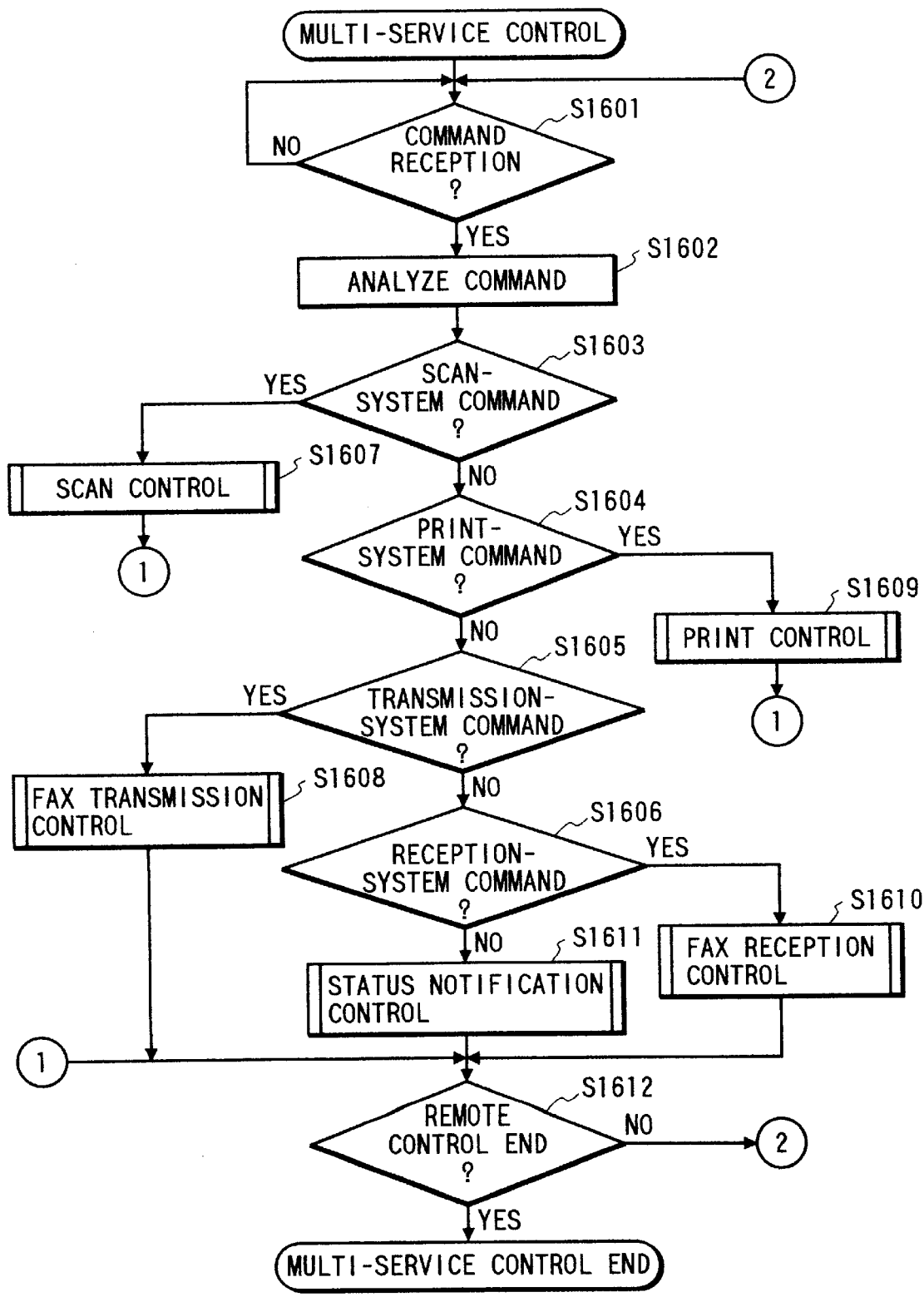
FIG. 31 is a flow chart illustrating multi-service control of the facsimile apparatus of this embodiment.

Next, the multi-service control of this embodiment will be described with reference to the flow chart of FIG. 31. The flow chart of FIG. 31 illustrates the procedure of a program to be executed by CPU 101 (microcomputer). This program is being stored in ROM 102.

First, CPU 101 judges whether a command sent from the information processing terminal (FAX server) via the network adapter 118 and I/F control unit 115 has been received, to thereby monitor a reception of a command from the information processing terminal (S1601). As the command is received from the information processing terminal, CPU 101 analyzes the resource type and the like of the command by using the header information set to the received command (S1602). Thereafter, processing corresponding to the received command is performed.

If CPU 101 judges from the command analysis that the received command is a command for the scan operation (S1603), scan control is executed (S1607). If CPU 101 judges that the received command is a command for the print operation (S1604), print control is executed (S1609). If it is judged that the received command is a command for the facsimile transmission operation (S1605), facsimile transmission control is executed (S1608). If CPU 101 judges that the received command is a command for the facsimile reception operation (S1606), facsimile reception control is executed (S1610). If it is judged that the received command is a command other than the above-described commands, the command is judged to be a command for notifying a status such as a presence/absence of a recording sheet of the facsimile apparatus, and status notification control is executed (S1611). If the command communication is to be terminated because of a shut-down of the information processing terminal or the like, CPU 101 terminates the multi-service control, and in other cases, the command reception at Step S1601 continues (S1612).

Figure 32:
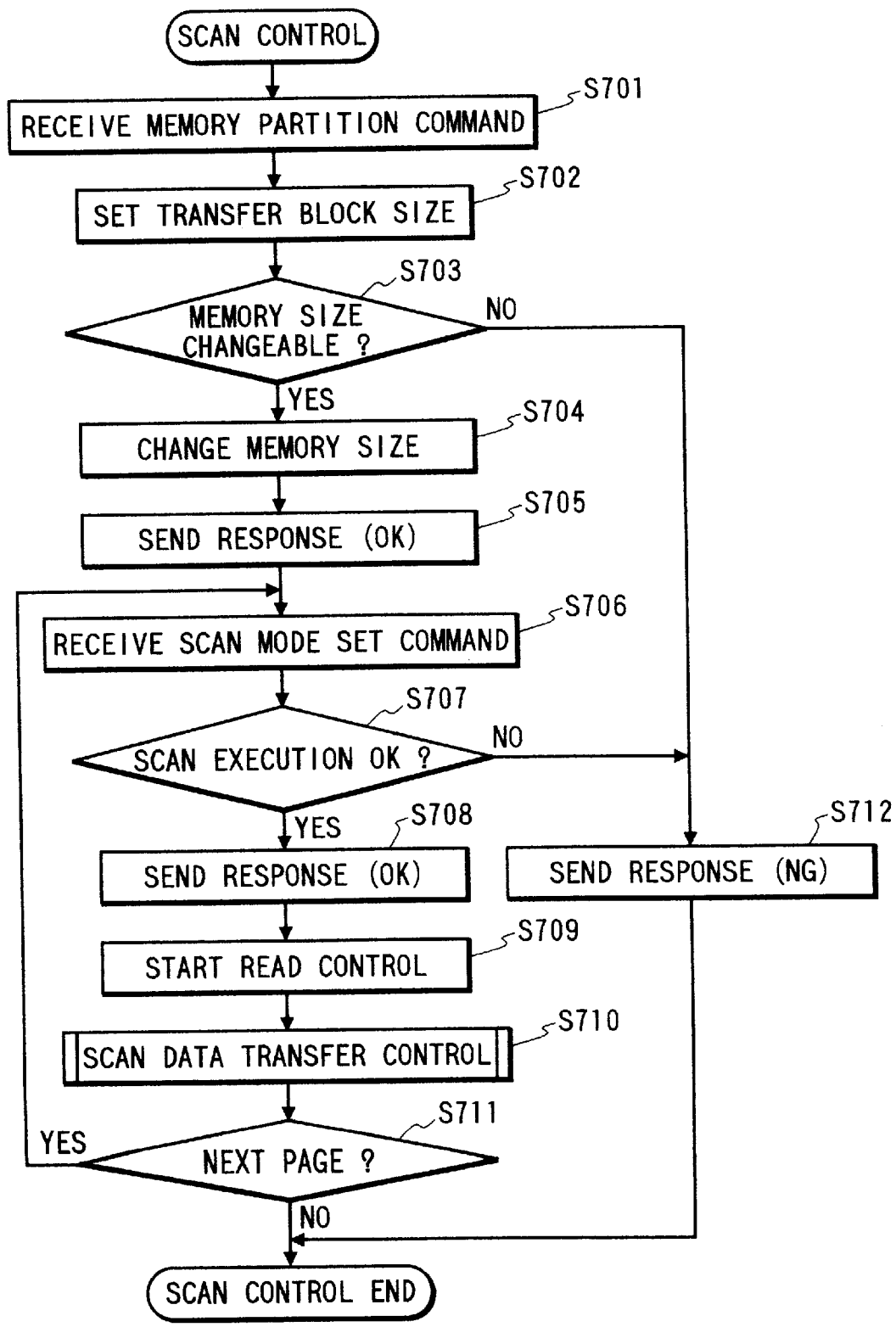
FIG. 32 is a flow chart illustrating scan control of the facsimile apparatus of this embodiment.
Figure 33:
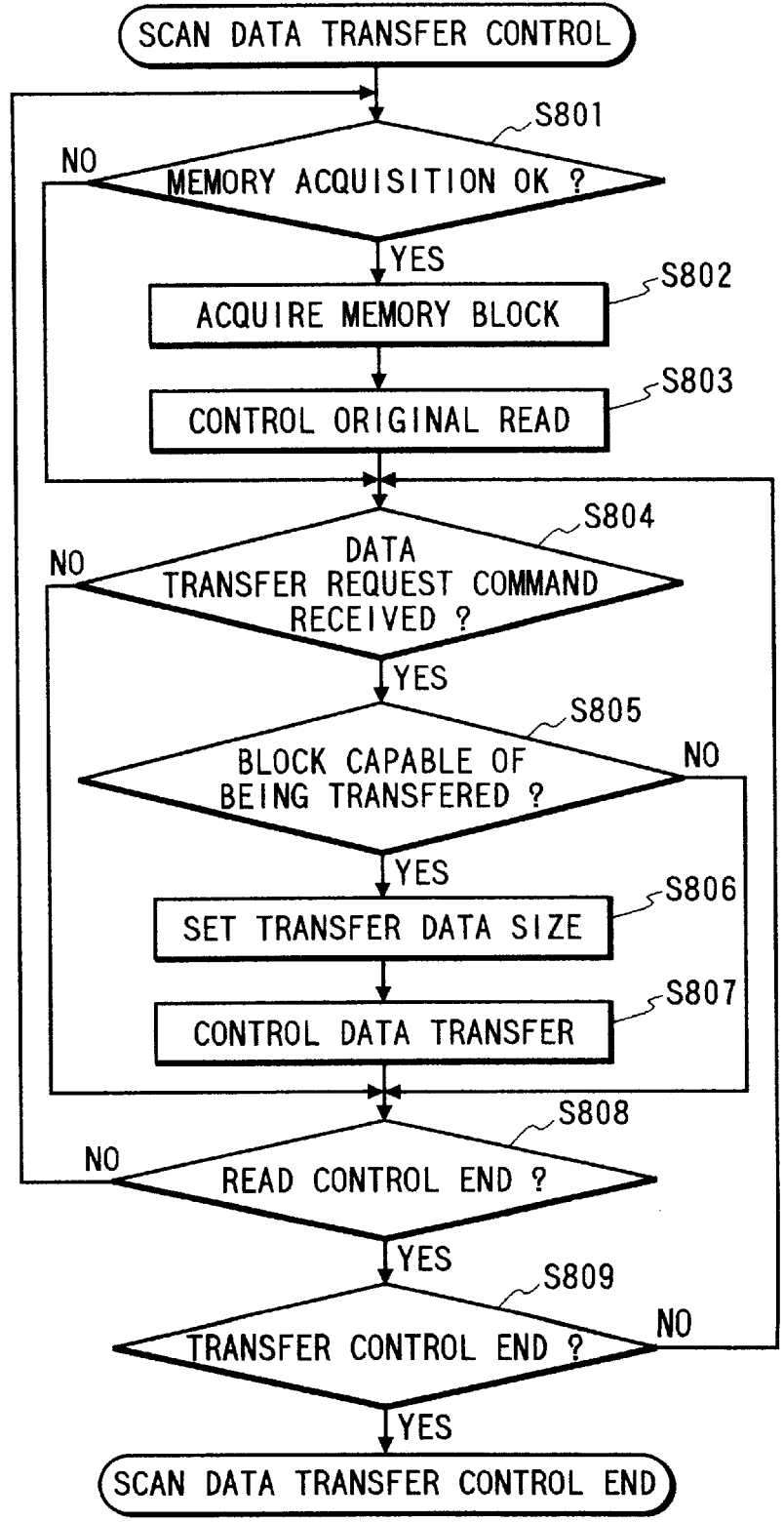
FIG. 33 is a flow chart illustrating scan data transfer control of the facsimile apparatus of this embodiment.

The scan control (S1607 in FIG. 31) will be described with reference to the flow charts of FIGS. 32 and 33. The flow charts of FIGS. 32 and 33 illustrate the procedure of a program stored in ROM 102 and executed by CPU 101.

First, CPU 101 executes a process of receiving a memory partition command classified as the scan control by the multi-service control (S701) and analyzes parameters added to the command. In this embodiment, the memory partition command is set with size data indicating a memory size necessary for transferring scanned image data and size data indicating a transfer block size which shows the size of image data to be transferred at a time to the information processing terminal.

CPU 101 sets the transfer block size in accordance with the parameter information added to the received memory partition command (S702). Next, the memory size data is read and it is judged whether the image memory of the facsimile apparatus can store the data of the read size (S703). If the image memory of the facsimile apparatus is already used for facsimile reception, local operation, or other operations and the necessary memory size cannot be acquired, an NG response signal is sent to the information processing terminal via the I/F control unit 115 and network adapter 118 in response to the received command (S712) to thereafter forcedly terminate the scan control. If CPU 101 judges at Step S703 that the image memory can store the data of the read size, the memory area for the scan operation having the size designated by the information processing terminal is acquired (S704), and an OK response signal representative of an acceptance of the command is sent to the information processing terminal (S705).

After the memory partition command is processed, CPU 101 executes a process of receiving the scan mode setting command for starting the read control of the facsimile apparatus (S706). The scan mode setting command of this embodiment is preset with a scan mode for selecting a read resolution, multi-value, or binary value necessary for read control and is preset with read control parameters such as a gamma table for read control in accordance with a predetermined format.

After reception of the scan mode setting command, CPU 101 judges whether the added parameters are in a preset range and whether the original to be scanned is set on the reader unit of the facsimile apparatus (presence/absence of an original) to thereby judge whether the scan control is executable (S707). If the scan operation cannot be performed because the original is not set or other reasons, CPU 101 sends an NG response signal to the information processing terminal (S712) to forcedly terminate the scan control. If the scan control is executable, CPU 101 sends an OK response signal to the information processing terminal (S708) to start the read control (S709).

After the read control starts, CPU 101 starts a transfer control of scan data of one page (S710), and the scan control for the whole original is repetitively executed (S711).

The transfer control of scan data of one page will be described with reference to the flow chart of FIG. 33.

CPU 101 checks whether the image memory reserved for the scan operation has an empty block (S801). The image memory of this embodiment is divided into preset block sizes, and the image data scanned by the reader control unit is sequentially stored in the blocks of the image memory.

If there is an empty block in the image memory at Step S801, CPU 101 acquires the memory block in the scan operation partition (S802), stores the image data scanned by the reader control unit in the acquired memory block of the image memory (S803), and judges whether the data transfer request command for transferring the scanned data to the information processing terminal has been received (S804).

If there is no empty block in the image memory at Step S801, i.e., if the memory block cannot be acquired because the scan data transfer to the information processing terminal is being delayed, CPU 101 temporarily stops the scan operation until the image memory is released.

If the data transfer request command for transferring the scanned data to the information processing terminal is received at Step S804, CPU 101 judges whether there is image data to be transferred (S805).

If there is no image data to be transferred at Step S805, i.e., if the read control of the facsimile apparatus is being delayed, CPU 101 does not execute the data transfer control but sends a busy response to the information processing terminal to continue the read control.

If the image data to be transferred is already prepared at Step S805, CPU 101 sets the image data of the transfer block size set at Step S702 in the image memory (S806) to start the control of data transfer to the information processing terminal (S807).

CPU 101 judges whether the read control has been completed (S808). If not, the procedure returns to Step S801 to continue the read control. If the read control has been completed, CPU 101 judges whether the transfer control has been completed (S809). If the transfer control of the scanned image data is not completed, the procedure returns to Step S804 to continue the transfer control. If both the read control and transfer control have been completed, it is judged that the transfer control of the scanned data of one page has been completed and the procedure is terminated.

Figure 34:
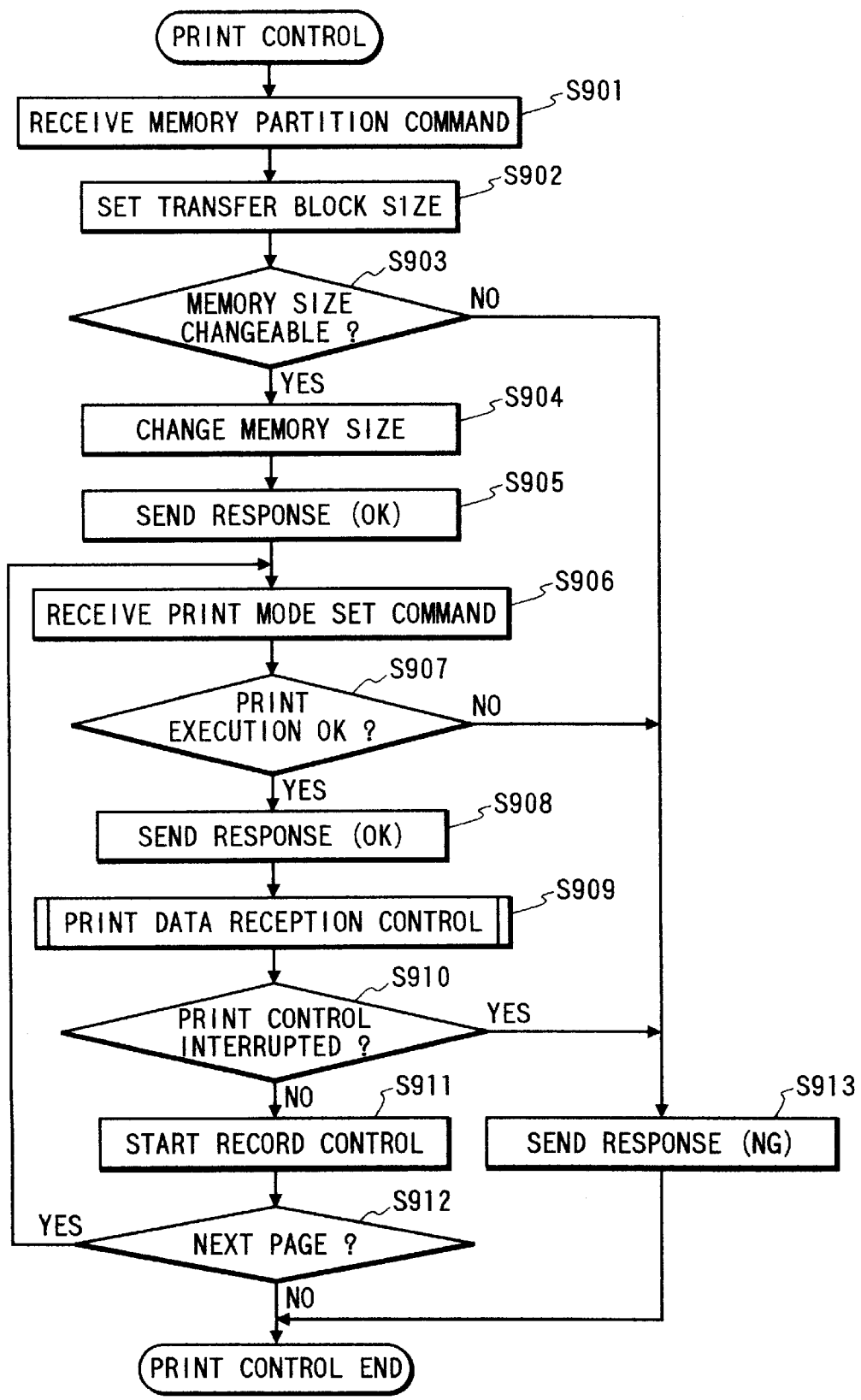
FIG. 34 is a flow chart illustrating print control of the facsimile apparatus of this embodiment.
Figure 35:
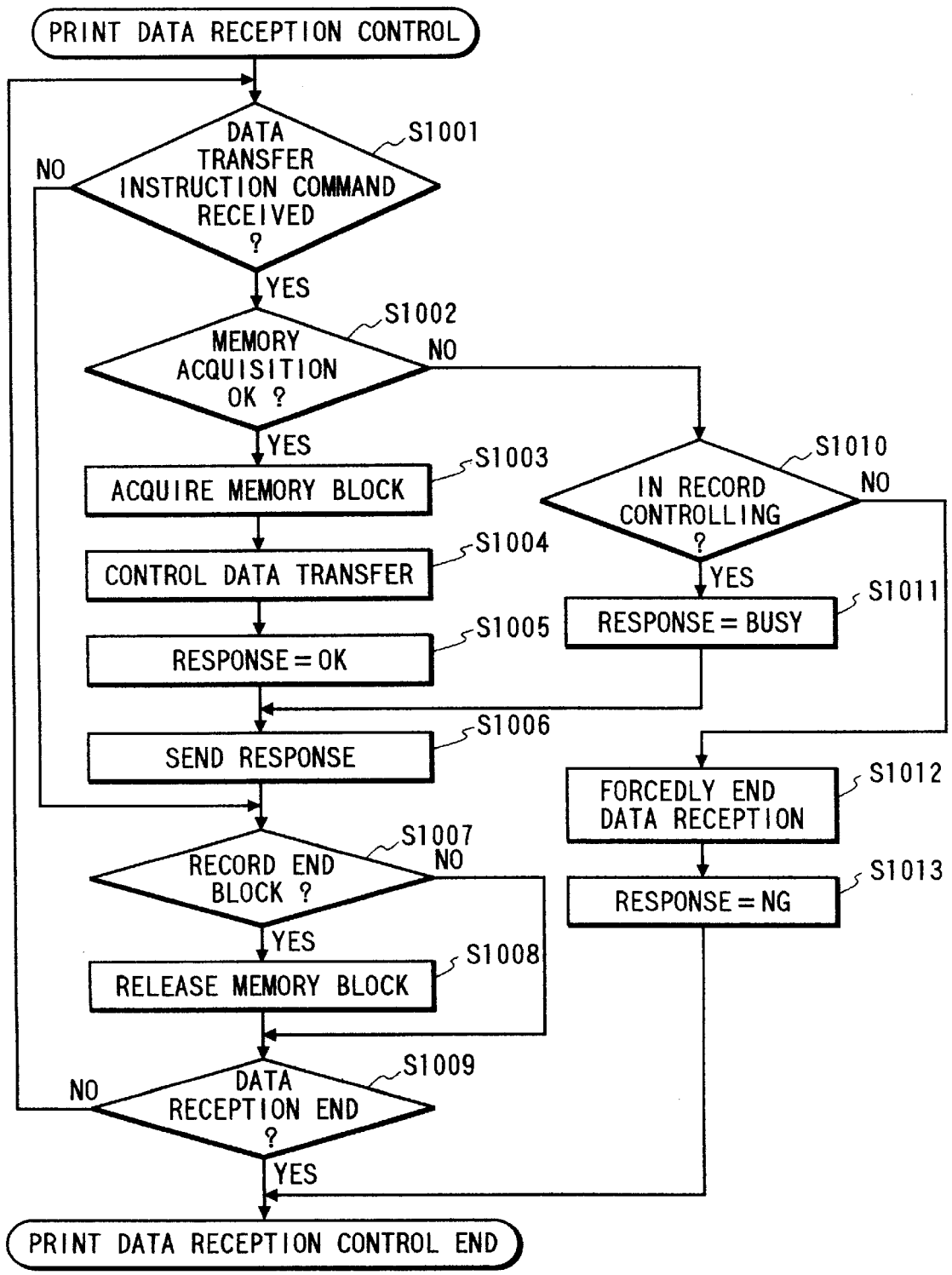
FIG. 35 is a flow chart illustrating print data reception control of the facsimile apparatus of this embodiment.

Next, the print control of this embodiment will be described with reference to the flow charts of FIGS. 34 and 35. The flow charts of FIGS. 34 and 35 illustrate the procedure of a program stored in ROM 102 and executed by CPU 101.

In the print control of this embodiment, the image data transferred from the information processing terminal is temporarily stored in the image memory of the facsimile apparatus, and when the image data of one page is stored, the record control starts. In this embodiment, therefore, it is necessary to assign the image memory a print control memory area capable of storing image data of at least one page.

First, CPU 101 executes a process of receiving a memory partition command classified as the print operation by the multi-service control (S901) and analyzes parameters added to the command. In this embodiment, the memory partition command is set with size data indicating a memory size necessary for storing image data to be printed and size data indicating a transfer block size which shows the size image data to be transferred at a time to the information processing terminal.

CPU 101 sets the transfer block size in accordance with the parameter information added to the received memory partition command (S902). Next, the memory size data is read and it is judged whether the image memory of the facsimile apparatus can be acquired (S903). If the image memory of the facsimile apparatus is already used for facsimile reception, local operation, or other operations and the image memory cannot be acquired, CPU 101 sends an NG response signal to the information processing terminal (S913) to thereafter forcedly terminate the print control.

If CPU 101 judges at Step S903 that the image memory can be acquired, CPU 101 acquires a memory area for the print operation having the size designated by the information processing terminal (S904), and an OK response signal representative of an acceptance of the command is sent to the information processing terminal (S905).

After the memory partition command is processed, CPU 101 executes a process of receiving the print mode setting command for executing the record control of the facsimile apparatus (S906). The print mode setting command of this embodiment is preset with a recording sheet size and a cassette type and is preset with record control parameters such as the number of record copies in accordance with a predetermined format.

After reception of the print mode setting command, CPU 101 judges whether the added parameters are in a preset range and whether the record control unit of the facsimile apparatus is defective to thereby judge whether the print control is executable (S907). If the print operation cannot be performed because the recorder control unit of the facsimile apparatus is defective or other reasons, CPU 101 sends an NG response signal to the information processing terminal (S913) to forcedly terminate the print control. If the scan control is executable, CPU 101 sends an OK response signal to the information processing terminal (S908).

Next, CPU 101 starts a transfer control of print data of one page (S909), and judges whether the print control is to be intercepted (S910). If the print control is to be intercepted because the print data of one page cannot be stored in the image memory of the facsimile apparatus or other reasons, CPU 101 sends an NG response signal to the information processing terminal in response to the data transfer instruction command (S913).

If the print control is not intercepted at Step S910 and the reception control of the print data of one page has been completed, CPU 101 starts the record control (S911), judges whether there is the next page (S912), and continues the processing until the record control of the last page is completed.

The reception control of print data of one page will be described with reference to the flow chart of FIG. 35.

CPU 101 monitors a reception of the data transfer instruction command for transferring the print data from the information processing terminal to the facsimile apparatus (S1001).

Upon reception of the data transfer instruction command, CPU 101 checks whether the image memory reserved for the print operation has an empty block (S1002). The image memory of this embodiment is divided into preset block sizes, and the transferred print data is sequentially stored in the blocks of the image memory.

If there is an empty block in the image memory at Step S1002, CPU 101 acquires the memory block in the print operation partition (S1003), stores the image data scanned by the reader control unit in the acquired memory block of the image memory (S1004).

When the print data is stored in the image memory of the facsimile apparatus, CPU 101 sets a response representative of a storage completion (S1005) and sends the response data to the information processing terminal (S1006).

If the memory block cannot be acquired at Step S1002, CPU 101 checks whether the print operation is presently executed (S1011). If the operation is the record control for the preceding page, the memory blocks for the print operation are sequentially released and a busy response signal is sent to the information processing terminal (S1011) to temporarily terminate the control of transferring the print data from the information processing terminal.

If it is judged at Step S1010 that the record control for the preceding page is not presently performed, CPU 101 judges that the print data of one page cannot be stored so that the data reception control is forcedly stopped (S1012) and sends an NG response signal to the information processing terminal (S1013) to forcedly terminate the print data reception control.

Next, CPU 101 judges whether there is a memory block in which the print data was stored by the recorder control unit (S1007). If there are memory blocks capable of being released, the memory blocks are sequentially released in order to execute the transfer control (S1008).

CPU 101 judges whether the print data of one page has been received (S1009), and if there is no next data, the procedure is terminated.

In the print operation and scan operation of the embodiment, a memory assignment control is performed by the memory partition command received from the information processing terminal during service execution. The invention is not limited only to this embodiment.

For example, the memory assignment control may be performed in a fixed manner by a memory partition command when the system is started up.

In the above embodiment, a memory assignment control is performed by the memory partition command before the service operation is executed. The invention is not limited only to this embodiment.

For example, the memory assignment control may be performed when the scan mode setting command for starting the scan operation is received.

Further, although the multi-service control assigns each service in accordance with the resource type contained in the command sent from the information processing terminal, the invention is not limited only to this embodiment.

For example, a command can be allocated to each service by using an ID such as a process ID specific to each service. In this case, a plurality of same services may be accepted so that a reservation control of facsimile transmission becomes possible.

Still further, although the print control is performed by temporarily storing print data transferred from the information processing terminal in the image memory of the facsimile apparatus, and by starting the record control when the transfer control of one page data is completed, the invention is not limited only to this embodiment.

For example, the record control may be started when the data control of data of a predetermined memory size is completed so that the print operation can be executed with a minimum memory size.

Furthermore, although the scan control is performed by temporarily storing scan data output during the read control in memory blocks of the facsimile apparatus and transferring this scan data to the information processing terminal synchronously with blocks, the invention is not limited only to this embodiment.

For example, the scan control may be performed synchronously with pages by storing scan data of one page in the image memory of the facsimile apparatus. It is also possible to automatically switch between a block synchronization and a page synchronization in accordance with a scan data size predicted in accordance with the read mode such as a resolution.

The programs to be executed by CPU 101 may be installed as application programs of a personal computer which is connected to a modem, a scanner, and a printer to configure a system capable of realizing the facsimile function. In this case, the personal computer installed with the programs realizes the facsimile function in response to a request from another client terminal on LAN.

In this embodiment, the command code is assigned to each command transferred from the information processing terminal in accordance with the contents of the command and the service type to be executed. Therefore, by analyzing the received command, it is possible to determine which operation mode the command has.

The scan, print, and FAX transmission operations of the embodiment shown in FIGS. 31 to 35 have been described in a sequential order. These operations may be executed at the same time.

In the embodiment, a plurality type of operations can be executed at the same time by the method illustrated in FIG. 29.

Specifically, while image data for print operation is transferred in unit of a predetermined block size, image data for print operation is transferred between print commands to realize the multi-service. Even while the scanned image is transferred to the information processing terminal, image data for print operation can be transferred.

The processing by the facsimile apparatus has been described above.

Next, a system inclusive of applications on the PC (data processing apparatus 18) side for controlling the facsimile apparatus will be described.

In the above embodiment, a plurality of services requested by a user (PC), such as document transmission, print request, scanner read, and the like, are processed at the same time. Applications on the PC side provided for a user can be developed so as to provide such service functions.

Specifically, even if a request for service, among various services capable of being executed at the same time at each terminal, is presently processed, another request for service, status, or the like can be issued from the terminal.

Further, a presence/absence of a reception document is checked by periodically monitoring the status (FIG. 20) of the file management unit, document information (FIG. 14), and the like to allow an up-load processing to be executed at an optional timing.

Still further, for data handling at each terminal, the data packet format shown in FIG. 4 is used so that data of a necessary service and the status of each device and job can be transferred between terminals at an optional timing in the form of a packet. Therefore, a data transfer request is issued when it becomes possible on each PC side.

Although physical interface and the like are not specifically defined herein on the assumption that they can transfer a packet bi-directionally, interface capable of transmitting data both from the PC side and the terminal side is used in the above embodiment.

Each terminal can execute the transfer processing (FIGS. 8, 16, and 21) if each control unit sets (FIG. 3) the data to be transferred to the PC side in the data queue (FIG. 6) of the buffer memory (FIG. 3). If a specific data flow control becomes necessary from the reason on the PC side, the transfer processing is temporarily suspended if necessary by using the functions of physical interface used, or other processing is executed.

For the execution of a service which shares a device resource such as a printer resource, data may be temporarily stored in the memory unit 16 to execute a predetermined processing, or acceptance of the service is inhibited if the shared device is in use. Such processing may be provided at the facsimile apparatus by conventional well known means.

More specific examples are used in the following description.

For the simplicity of description, it is assumed that data set in the buffer of a facsimile apparatus is received in response to a data transfer request from an information processing terminal.

In the above embodiment, data can be transmitted from a facsimile apparatus at a desired timing. Depending upon physical interface used, this data transfer control is not possible. In such a case, the data transfer control described above is utilized.

The objects of the invention can be achieved by using one of the above data transfer controls.

Figure 36:
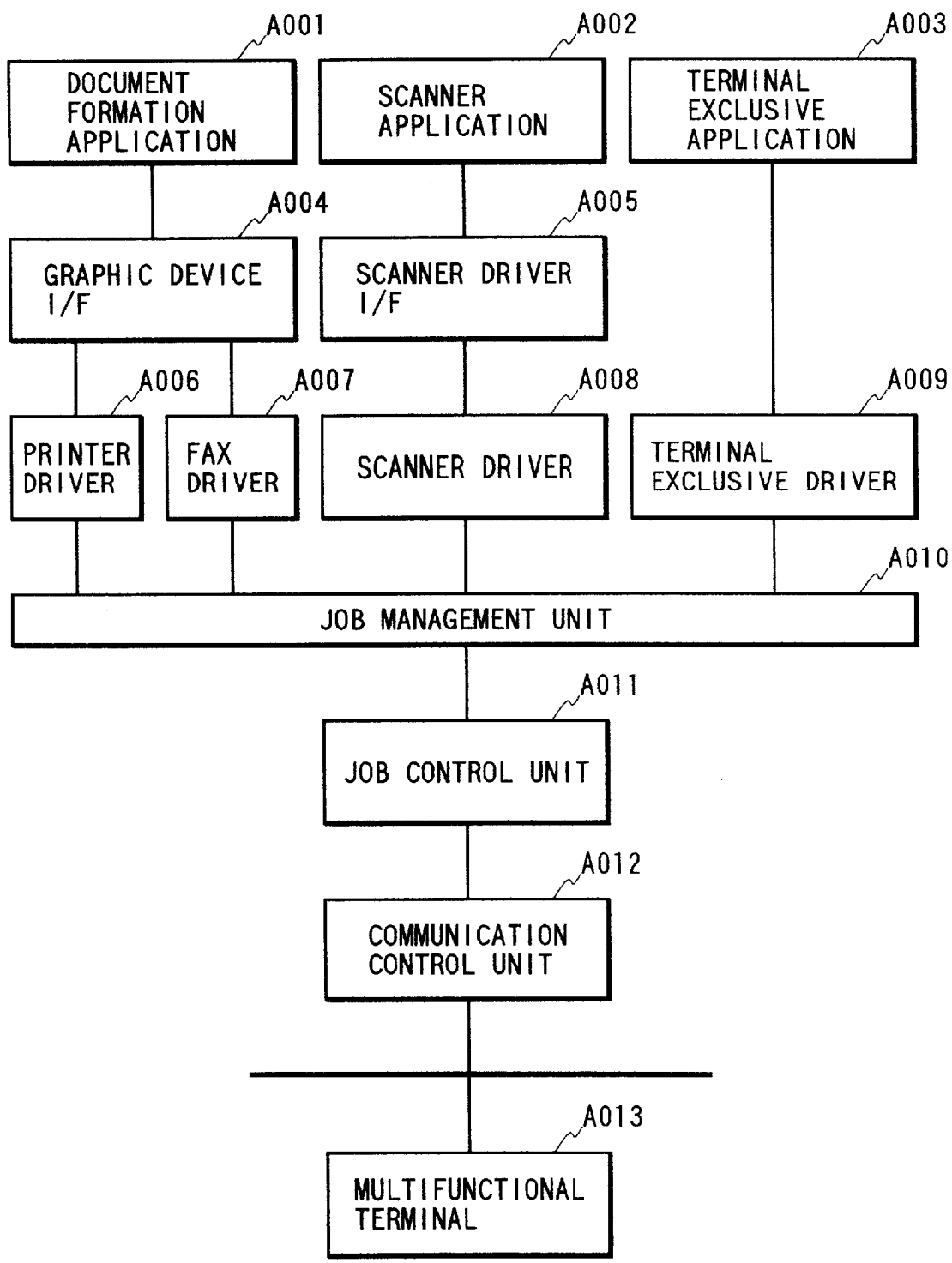
FIG. 36 shows the software configuration of PC.

FIG. 36 is a schematic diagram showing the software configuration of an information processing terminal for the data transmission/reception to and from a facsimile apparatus according to an embodiment of the invention.

A document formation application A001 is application software, typically a word processor for forming a document. A scanner application A002 is scanner application software for processing image data read with a scanner or the like for display, edit, OCR, and the like. A terminal exclusive application A003 is an exclusive application for controlling a multifunctional terminal A013 and can perform a print-out of image data such as reception document, a transmission request of image data, an image read, and the like. It can also perform an update of data registered in the facsimile apparatus, a monitor of status, and the like.

A graphic device I/F A004 is a standard library group generally provided by an OS of PC for performing graphic operations by using application software. A scanner driver I/F A005 is a standard interface between the scanner application A002 and a scanner driver A008.

A printer driver A006 is drive software for generating print data compatible with the printer function of the facsimile apparatus. A FAX driver A007 is drive software for generating data which is used for activating the facsimile function of the facsimile apparatus. The scanner driver A008 is drive software for operating a scanner of the facsimile apparatus. A terminal exclusive driver A009 is drive software for operating various device resources of the facsimile apparatus.

A job control unit A010 is used for managing a plurality of jobs as job data in order to perform the multi-operation of this embodiment.

For example, the following jobs are managed by a job management table shown in FIG. 38 to be described later.

(1) A print job requested by the document formation application A001. This job is managed by making a file of data generated by the printer driver A006.

(2) A document data FAX transmission job requested by the document formation application A001. This job is managed by adding information such as a designated partner if the FAX driver A007 is selected as a user's driver.

(3) A document read job of reading a document with the scanner unit, the job being requested by the scanner application A002.

(4) Jobs such as FAX transmission, reception document transfer, scanner read, and image print, the jobs being requested by the terminal exclusive application A003.

The job control unit A011 schedules various jobs managed by the job management unit A010 and controls the execution of the jobs. A plurality of jobs can be activated at the same time. In this case, a predetermined process of transferring data to the multifunctional terminal A013 via the communication control unit A012 is performed.

The communication control unit A012 performs data transmission/reception to and from the facsimile apparatus connected via the parallel port of the information processing terminal.

Figure 37:
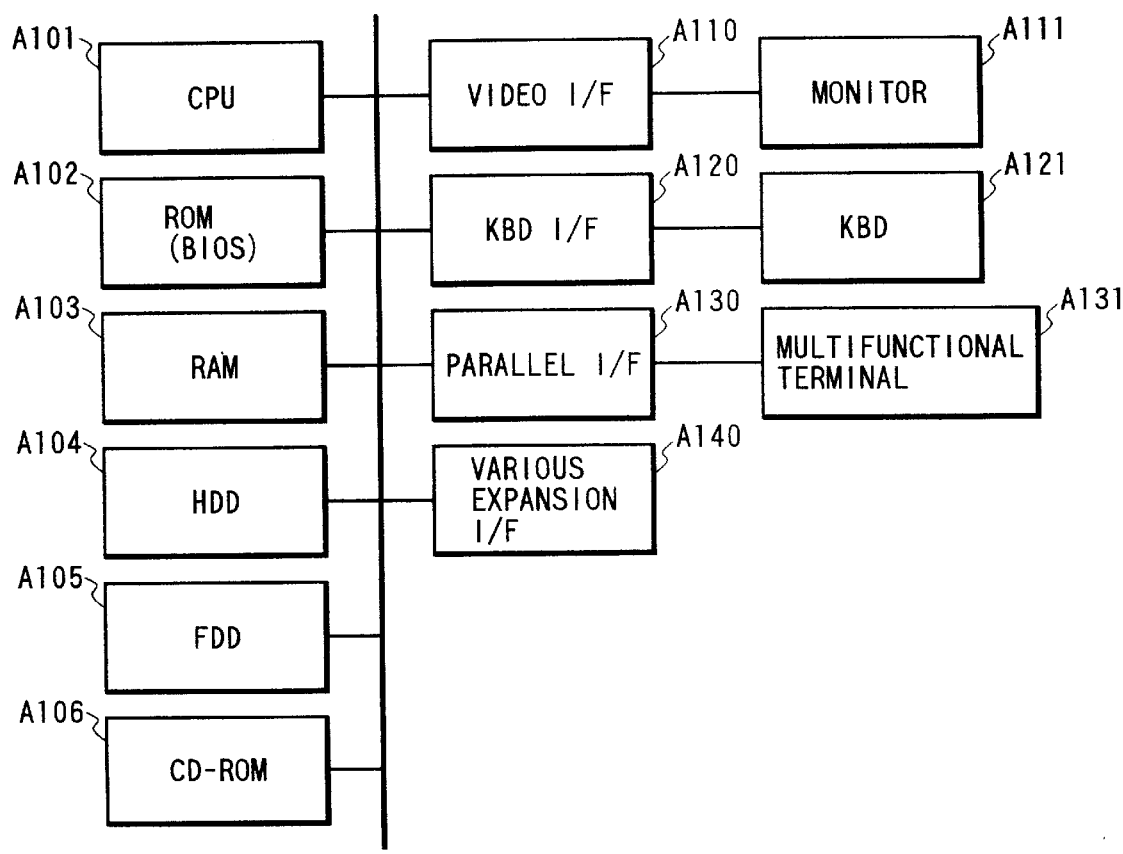
FIG. 37 is a block diagram of PC.

FIG. 37 is a block diagram showing the outline of the structure of the information processing terminal.

The information processing terminal is constituted of a controller unit including a CPU A101 for performing software control of the terminal, a ROM A102 for storing BIOS and the like, a RAM A103 used for executing various application programs, an HDD A104 for storing OS, various application software, data, and the like, an FDD drive A105 for access to a floppy disk, and a CD-ROM drive A106 for access to a CD-ROM. The information processing terminal further includes a video IF A110 for connecting a display monitor A111, a keyboard I/F A120 for connecting a keyboard A121, a parallel I/F A130 for connecting the multifunctional terminal A131 of this embodiment, and various expansion I/F A140 for connecting expansion interface such as a SCSI board.

Each application program shown in FIG. 36 is stored in ROM A102, HDD A104, FDD A105, or CD-ROM A106.

The job management unit A010 will be described with reference to FIG. 38.

FIG. 38 is a conceptional diagram of a management table used by the job management unit for managing the status of each job.

"JOB ID" is an ID assigned to each job for unanimously identifying each job, this job being assigned when a job is activated. A job is generated basically in response to a request from each application. In this example, a terminal status request for checking whether there is a reception document, is processed as one job.

"STATUS" indicates an execution status of each job (status such as under execution and standby).

"KIND OF SERVICE" indicates the type of each job (read request, print request, status request, reception document up-load request, and the like).

"FILE ID" indicates a specific number for identifying a file to be used. "PARAMETER" indicates information to be notified to the multifunctional terminal or acquired information.

Figure 39:
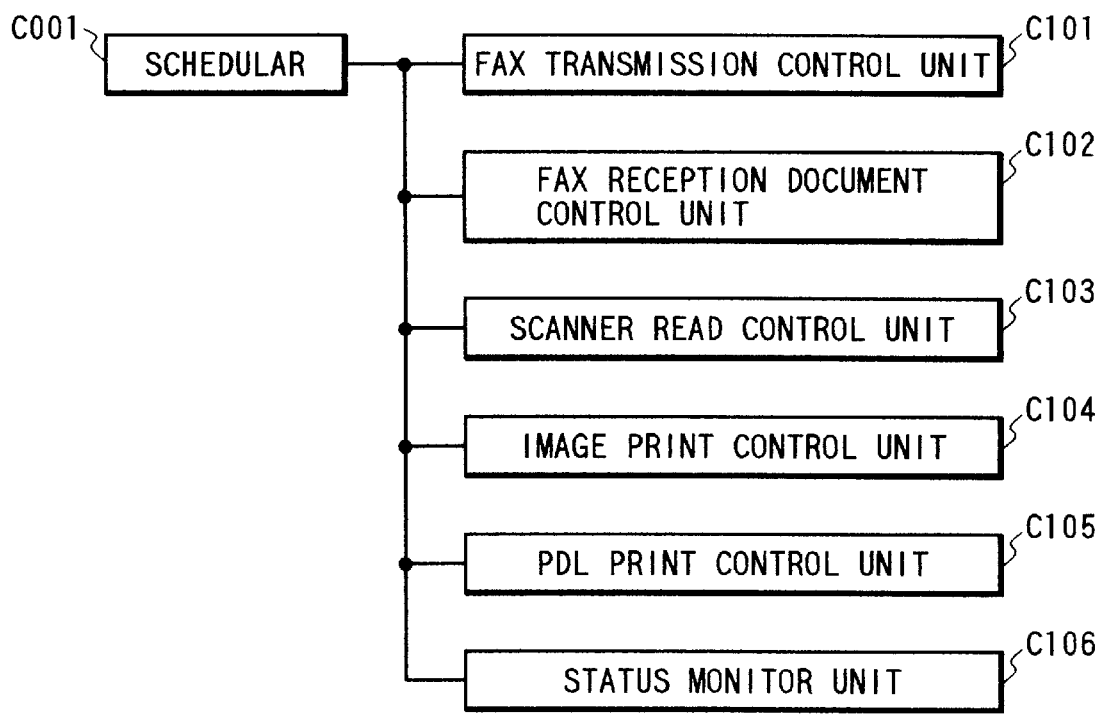
FIG. 39 is a diagram showing the structure of a job control unit.

FIG. 39 shows the structure of the job control unit A011.

A scheduler C001 schedules the execution order of jobs registered in the job management table, selects one of the control units C101 to C106 in accordance with the type of each job to execute processing of each job.

Each control unit operates independently. The multi-operation can be realized through data transfer processing by the communication control unit A012.

Figure 40:
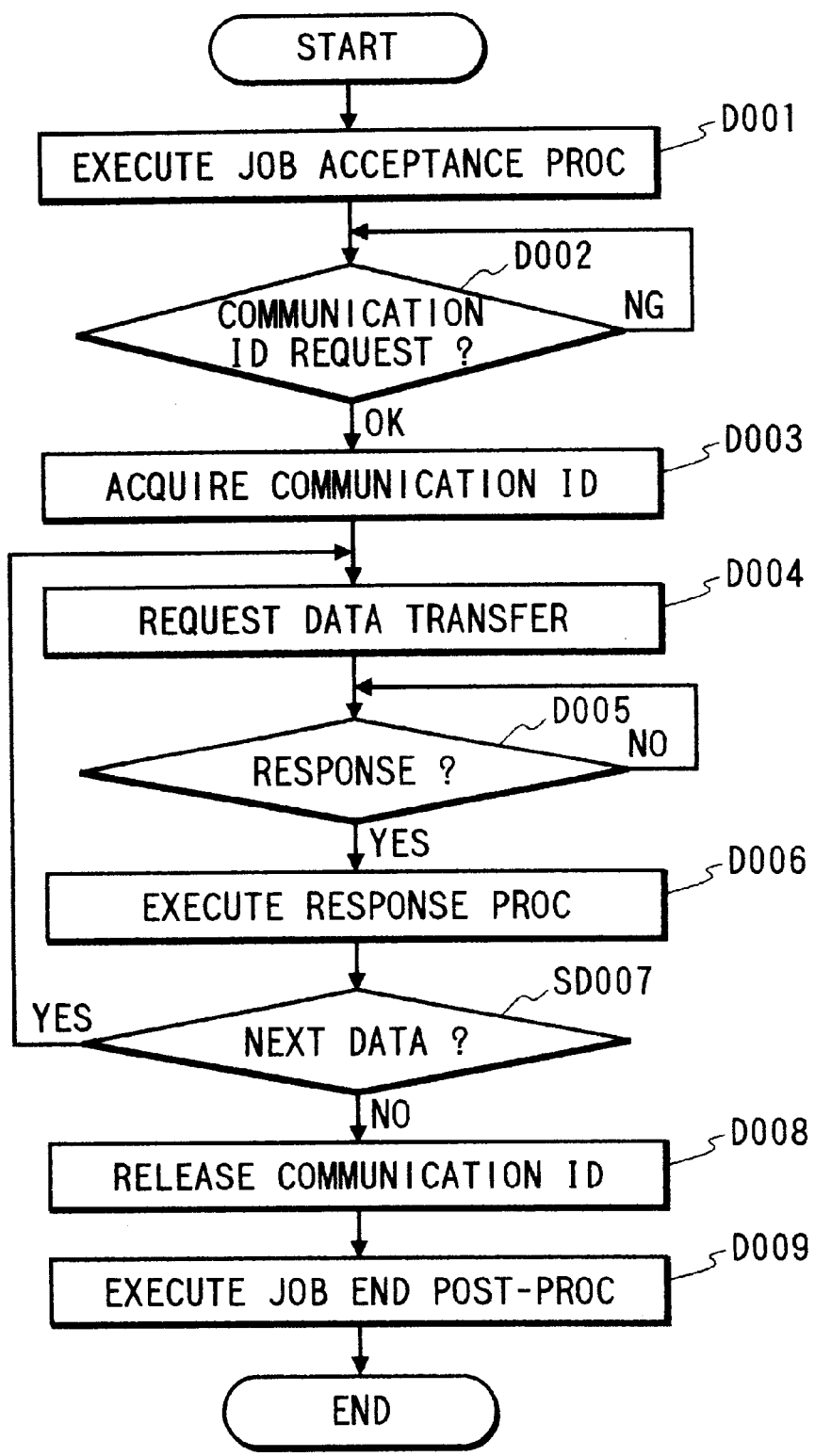
FIG. 40 is a flow chart illustrating job processing at each control unit.

FIG. 40 is a flow chart illustrating a standard job processing to be executed by each control unit.

At Step D001, the contents of a job request received from the scheduler are checked and a preprocess necessary for job control is performed. At Step D002 it is checked whether a communication ID for communication with the terminal has been received from the communication control unit A012. In this case, a control privilege may be returned to the scheduler C001 by using an error notification.

If the communication ID was acquired at Step D003, the data transfer processing for transferring data to the terminal via the communication control unit A012 is thereafter performed by using the acquired communication ID.

A data transfer request is performed at Step D004. The contents of the data change depending upon the processing contents of each job, and may be command parameters indicating the service contents of the terminal, document data itself, or only a data request command from the terminal. The predetermined data format and the like are used.

It is checked at Step D005 whether there is a response to the data transfer response. In this example, data transfer from each control unit is performed by repetitive transmission/reception in unit of one block.

At Step D006 the response data from the terminal is processed. This response data to the data transfer request at Step D004 changes with each control unit, and may be a reception confirmation notification from the terminal, data such as scanner data and reception data, or status data of the terminal. Each response data is processed in a manner specific to each control unit.

It is checked at Step D007 whether there is another data transfer processing to be executed next. If there is another data transfer processing, the data transfer request is again performed, whereas if not, the end processing is performed.

If the data transfer processing is completed, the used communication ID is returned to the communication control unit A012 at Step D008. At Step D009 a predetermined job end post-processing is performed at each control unit to terminate the job. For example, the received document file is stored.

Figure 41:
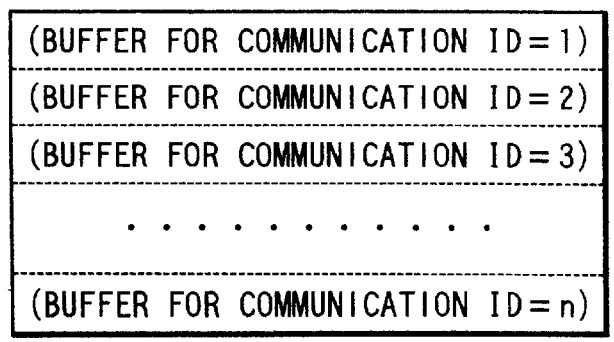
FIG. 41 is a diagram showing a communication buffer of a communication control unit.

FIG. 41 shows an example of data transfer communication buffers used by the communication control unit A012 for the data transfer to the terminal (facsimile apparatus).

In order to realize a multi-job operation, several buffers for a plurality of jobs are prepared and managed by using communication IDs.

Figure 42:
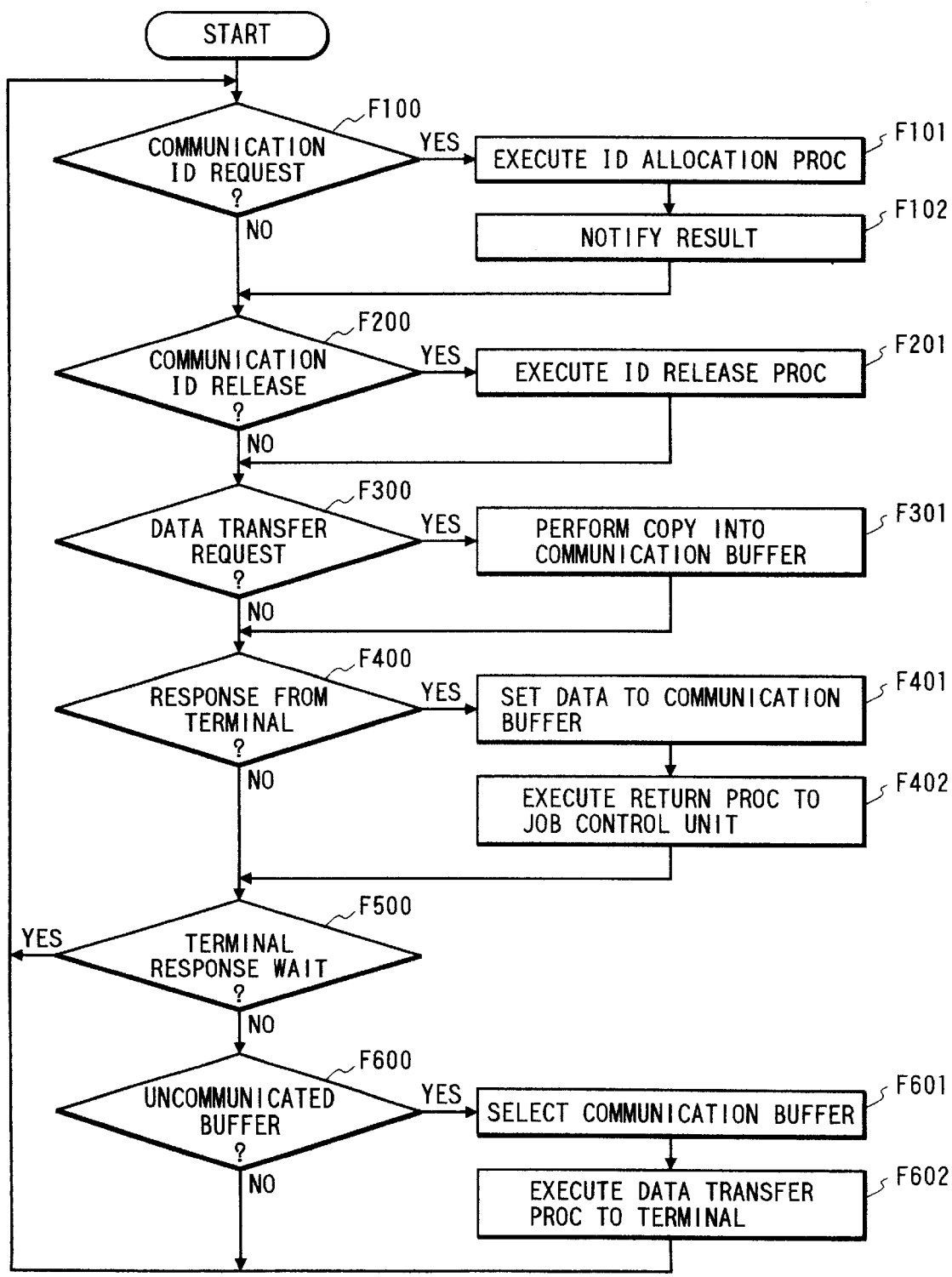
FIG. 42 is a flow chart illustrating processing by the communication control unit.

FIG. 42 is a flow chart illustrating the operation of the communication control unit A012 using the communication buffers.

It is checked at Step F100 whether the communication ID acquire request is issued from each control unit. If issued, it is confirmed whether there is an empty buffer or whether communication with the terminal is possible (F101). The confirmation result is returned to the control unit which issued the request (F102).

It is checked at Step F200 whether there is a communication ID release request. If there is a request, the buffer corresponding to the designated ID is released (F201).

It is checked at Step F300 whether there is a data transfer request from each control unit. If there is a request, data is temporarily stored in the buffer corresponding to the designated ID (F301).

It is checked at Step F400 whether there is a response from the terminal (facsimile apparatus). If there is a response, data is set to the buffer corresponding to the communication ID for which data was transferred to the terminal just before the response (F401), and the data is sent back to the control unit which allocated the communication ID (F402).

It is checked at Step F500 whether a response from the terminal is waited for. If a response is waited for, the procedure returns to Step F100 to repeat the above processes.

If a response is not waited for at Step F500, it is checked at Step F600 whether there is data to be transferred to the terminal. If not, the procedure returns to Step F100, whereas if there is data, a communication buffer (ID) which performs the data transfer processing is selected (F601). In this case, the buffer may be selected in various ways depending upon the functions of the information processing terminal. For example, the buffers may be selected in a sequential order, or the data transfer processing may be performed always in the order of smaller ID. After the buffer is selected, the data transfer processing for the terminal is executed (F602) to return to Step F100.

According to the above embodiments, in executing different functions in accordance with data transferred from the information processing terminal, the data transferred from the information processing terminal is analyzed, a function corresponding to the analyzed data is discriminated, data to be transferred in accordance with the discriminated function to and from the information processing terminal is mixed with data to be transferred in accordance with another function, and a plurality of different functions are executed at the same time by using the mixed data. Accordingly, data is discriminated for each function, and the data for each function is processed at proper timings to execute a plurality of functions at the same time, thereby efficiently using the functions of the communication apparatus. A business machine can therefore be realized which can efficiently perform business transactions and the like in an office.

Input/output of a plurality of document data to and from the information processing terminal is controlled at the same time. Since input/output of a plurality of document data is executed at the same time, the efficiency of document processing can be improved.

In executing different functions in accordance with data transferred from the information processing terminal, the buffer memory is divided into a plurality of block areas and managed in unit of block area for each function, and the number of block areas of the buffer memory to be used is changed in accordance with the operation status of each function to be executed so that a plurality of different functions can be executed at the same time. Accordingly, in executing a plurality of different functions, the number of blocks of the buffer memory used for each function is changed in accordance with the operation status. It is therefore possible to execute the functions in a time division manner faster than when each function is executed separately. The total efficiency can therefore be improved. A business machine can therefore be realized which can efficiently perform business transactions and the like in an office.

In executing a plurality of different functions, data output from at least one of a plurality of output devices including the information processing terminal is accepted, and the accepted data is internally processed as data to be output to at least one of a plurality of input devices including the information processing terminal. Accordingly, since the input and output devices are controlled at the same time, a load on the information processing terminal can be reduced. A business machine can therefore be realized which can efficiently perform business transactions and the like in an office.

In executing different functions in accordance with data transferred from the information processing terminal, an output device and an input device designated in accordance with the data from the information processing terminal are analyzed, and different functions are executed by using the analyzed input and output devices. A batch process service can therefore be provided by controlling the input and output devices at the same time.

In executing different functions in accordance with data transferred from the information processing terminal, data communication with the information processing terminal with respect to a specific function among the plurality of different functions is executed with a priority over data communication with respect to other functions. Therefore, a selective priority process service can be provided in executing a plurality of different functions so that the process speed of data communication with the information processing terminal can be prevented from being lowered. A business machine can therefore be realized which can efficiently perform business transactions and the like in an office.

Since a function of preferentially executing data communication with the information processing terminal can be selected, a desired function can be preferentially selected to thereby improve the efficiency of business transactions and the like.

The invention is not limited only to the above embodiments, but various modification are possible without departing from the scope of the appended claims.

What is claimed is:

1. A communication apparatus connectable via an interface to an information processing terminal for executing a job of a predetermined function in response to a request from the information processing terminal, comprising:

data analyzing means for analyzing data transferred from the information processing terminal;

data discriminating means for discriminating a function corresponding to the analyzed data;

transfer control means for controlling such that a data transfer operation in accordance with a job of the discriminated function to and from the information processing terminal and another data transfer operation in accordance with another job of another function are concurrently executed; and control means for independently executing in parallel the job and the other job of individually different functions by using the transferred data.

2. A communication apparatus according to claim 1, wherein a plurality of sets of data are input and output in parallel to and from the information processing terminal.

3. A communication apparatus according to claim 2, further comprising:

memory means having a plurality of block areas used for data communication with the information processing terminal;

management means for managing said memory means in units of block area for each of the functions; and changing means for changing the number of block areas of said memory means in accordance with an operation status of the function to be executed by said control means.

4. A communication apparatus according to claim 1, wherein said control means includes:

accepting means for accepting data output from at least one of a plurality of output devices including the information processing terminal; and internal processing means for internally processing the accepted data as data to be output to at least one of the plurality of input devices including the information processing terminal.

5. A communication apparatus according to claim 1, wherein said data analyzing means analyzes an output device and an input device designated in accordance with data from the information processing terminal, and executes different functions at the same time by using the analyzed output device and input device.

6. A communication apparatus according to claim 1, further comprising priority processing means for processing data communication with the information processing terminal with respect to a specific function of the different functions to be executed at the same time, with a priority over data communication with respect to other functions.

7. A communication apparatus according to claim 6, further comprising selecting means for selecting a function to be preferentially processed for data communication with the information processing terminal.

8. A processing method for a communication apparatus connectable via an interface to an information processing terminal for executing a job of a predetermined function in response to a request from the information processing terminal, the processing method comprising the steps of;

analyzing data transferred from the information processing terminal;

discriminating a function corresponding to the analyzed data;

controlling such that a data transfer operation in accordance with a job of the discriminated function to and from the information processing terminal and another data transfer operation in accordance with another job of another function are concurrently executed; and independently executing in parallel the job and the other job of individually different functions by using the transferred data.

9. A processing method according to claim 8, wherein a plurality of sets of data are input and output in parallel to and from the information processing terminal.

10. A processing method according to claim 9, further comprising the steps of:

performing input and output of the plurality of sets of data by using memory means having a plurality of block areas;

managing the memory means in units of block area for each of the functions; and changing the number of block areas of the memory means in accordance with an operation status of the function to be executed.

11. A processing method according to claim 8, wherein:

data output from at least one of a plurality of output devices including the information processing terminal is accepted; and the accepted data is internally processed as data to be output to at least one of the plurality of input devices including the information processing terminal.

12. A processing method according to claim 8, wherein an output device and an input device designated in accordance with data from the information processing terminal are analyzed, and different functions are executed at the same time by using the analyzed output device and input device.

13. A processing method according to claim 8, wherein data communication with the information processing terminal with respect to a specific function is executed with a priority over data communication with respect to other functions.

14. A processing method according to claim 8, wherein the information processing terminal outputs, during data communication with the communication apparatus with respect to one function, a request for another function to the communication apparatus.

15. A communication apparatus connectable via an interface to an information processing terminal for executing a process of a predetermined function in response to a request from the information processing terminal, comprising:
   processing means for processing a plurality of individual jobs;
   communication means for communicating data based on each of the plurality of individual jobs with the information processing terminal via the interface; and
   control means for controlling said processing means and said communication means such that said processing means processes the plurality of individual jobs in parallel and said communication means communicates concurrently a plurality of data based on each of the plurality of individual jobs.

16. A communication apparatus according to claim 15, wherein said control means controls said communication means such that said communication means communicates concurrently the plurality of data in a time sharing manner.

17. A communication apparatus according to claim 15, wherein said control means controls said processing means such that said processing means executes jobs which is concurrently capable of being executed.

18. A communication apparatus according to claim 15, wherein said processing means executes a job of transferring image data representing an image read by a reader to the information processing terminal.

19. A communication apparatus according to claim 15, wherein said processing means executes a job of printing received data from the information processing terminal by using a printer.

20. A communication apparatus according to claim 15, wherein said processing means executes a job of transmitting data via a line in accordance with an instruction of the information terminal.

21. A communication apparatus according to claim 15, wherein said processing means executes a job of transferring data received via a line to the information terminal.

22. A communication method for use on a communication apparatus connectable via an interface to an information processing terminal for executing a process of a predetermined function in response to a request from the information processing terminal, said method comprising the steps of:
   processing a plurality of individual jobs;
   communicating data based on each of the plurality of individual jobs with the information processing terminal via the interface; and
   controlling said processing step and said communicating step such that said processing step processes the plurality of individual jobs in parallel and said communicating step communicates concurrently a plurality of data based on each of the plurality of individual jobs.

23. A computer-readable memory medium storing code for controlling a processor-controlled communication apparatus connectable via an interface to an information processing terminal for executing a job of a predetermined function in response to a request from the information processing terminal to perform a method comprising the steps of:
   analyzing data transferred from the information processing terminal;
   discriminating a function corresponding to the analyzed data;
   controlling such that a data transfer operation in accordance with a job of the discriminated function to and from the information processing terminal and another data transfer operation in accordance with another job of another function are concurrently executed; and
   independently executing in parallel the job and the other job of individually different functions by using the transferred data.

24. A computer-readable memory medium storing code for controlling a processor-controlled communication apparatus connectable via an interface to an information processing terminal for executing a process of a predetermined function in response to a request from the information processing terminal to perform a method comprising the steps of:
   processing a plurality of individual jobs;
   communicating data based on each of the plurality of individual jobs with the information processing terminal via the interface; and
   controlling said processing step and said communicating step such that said processing step processes the plurality of individual jobs in parallel and said communicating step communicates concurrently a plurality of data based on each of the plurality of individual jobs.

* * * * *

UNITED STATES PATENT AND TRADEMARK OFFICE
CERTIFICATE OF CORRECTION

PATENT NO. : 6,301,611 B1
DATED : October 9, 2001
INVENTOR(S) : Naoyuki Matsumoto et al.

It is certified that error appears in the above-identified patent and that said Letters Patent is hereby corrected as shown below:

SHEET 2
FIG. 2, "DUCUMENT" should read -- DOCUMENT --.

SHEET 24,
FIG. 26, "REDER" should read -- READER --.

SHEET 30,
FIG. 33, "TRANSFERED" should read -- TRANSFERRED --.

SHEET 36,
FIG. 39, "SCHEDULAR" should read -- SCHEDULER --.

Column 14,
Line 17, "image" should read -- of image --.

Column 16,
Line 44, "unit" should read -- units --.

Column 19,
Line 32, "unit" should read -- units --.

Column 20,
Line 52, "unit" should read -- a unit --.

UNITED STATES PATENT AND TRADEMARK OFFICE
CERTIFICATE OF CORRECTION

PATENT NO.    : 6,301,611 B1
DATED         : October 9, 2001
INVENTOR(S)   : Naoyuki Matsumoto et al.

It is certified that error appears in the above-identified patent and that said Letters Patent is hereby corrected as shown below:

Column 23,
Line 34, "is" should read -- are --.

Signed and Sealed this

Twelfth Day of March, 2002

Attest:

Attesting Officer

JAMES E. ROGAN
Director of the United States Patent and Trademark Office